(12) United States Patent
Leinonen et al.

(10) Patent No.: US 7,676,243 B2
(45) Date of Patent: *Mar. 9, 2010

(54) INTEROPERABILITY IMPROVEMENT BETWEEN RECEIVERS AND TRANSMITTERS IN A MOBILE STATION

(75) Inventors: Marko E. Leinonen, Oulu (FI); Juha Valtanen, Oulu (FI)

(73) Assignee: Nokia Corporation, Espoo (FI)

( * ) Notice: Subject to any disclaimer, the term of this patent is extended or adjusted under 35 U.S.C. 154(b) by 832 days.

This patent is subject to a terminal disclaimer.

(21) Appl. No.: 11/473,275

(22) Filed: Jun. 20, 2006

(65) Prior Publication Data

US 2007/0082622 A1 Apr. 12, 2007

Related U.S. Application Data

(63) Continuation-in-part of application No. 11/020,981, filed on Dec. 22, 2004, now abandoned, and a continuation-in-part of application No. 11/141,838, filed on May 31, 2005, now Pat. No. 7,477,915.

(51) Int. Cl.
*H04B 1/00* (2006.01)

(52) U.S. Cl. .................. 455/550.1; 455/78; 455/82; 455/83; 455/575.7; 455/132; 455/69; 455/303

(58) Field of Classification Search .............. 455/550.1, 455/69, 78, 82, 83, 575.7, 553.1, 132, 303, 455/306, 307
See application file for complete search history.

(56) References Cited

U.S. PATENT DOCUMENTS 6,023,609 A * 2/2000 Futamura ................. 455/82

6,442,375 B1 * 8/2002 Parmentier ................. 455/78

(Continued)

FOREIGN PATENT DOCUMENTS

EP 0665 643 A2 1/1995

(Continued)

OTHER PUBLICATIONS

Public Safety PSWN Program Wireless Network "Public Safety Radio Frequency Spectrum Digital Television Transition Status Update" Jan. 2002, pp. 1-14.

(Continued)

*Primary Examiner*—Marceau Milord
(74) *Attorney, Agent, or Firm*—Harrington & Smith

(57) ABSTRACT

A mobile station is disclosed that includes a first antenna, at least one second antenna, and a receiver coupled to the first antenna. The receiver includes first control logic configured to generate a notification of the receiver being able to receive a reception frequency band and includes a transmitter coupled to the at least one second antenna and the receiver. The transmitter communicates radio frequency (RF) signals in a transmission frequency band over an RF transmit path to the at least one second antenna. The transmitter includes a tunable filter coupleable to the RF transmit path, and second control logic configured to adjust at least one characteristic of the tunable filter based at least in part on the notification. The adjustment is performed to reduce, when the tunable filter is coupled to the RF transmit path, interference caused by transmission in the transmission frequency band with reception in the reception frequency band.

35 Claims, 25 Drawing Sheets

U.S. PATENT DOCUMENTS

| | | | |
|---|---|---|---|
| 6,549,567 | B1 | 4/2003 | Fullerton .................. 375/219 |
| 6,952,595 | B2 * | 10/2005 | Ikedo et al. ............. 455/553.1 |
| 6,970,681 | B2 * | 11/2005 | Darabi et al. ................ 455/73 |
| 6,975,667 | B2 * | 12/2005 | Mattisson et al. ........... 375/132 |
| 7,171,235 | B2 * | 1/2007 | Haapoja ................. 455/553.1 |
| 7,272,366 | B2 * | 9/2007 | Haapoja et al. .......... 455/114.2 |
| 7,477,915 | B2 * | 1/2009 | Leinonen et al. ......... 455/550.1 |
| 2002/0010763 | A1 | 1/2002 | Salo et al. .................. 709/220 |
| 2003/0228892 | A1 | 12/2003 | Maalismaa et al. ....... 455/575.7 |
| 2003/0236065 | A1 | 12/2003 | Leinonen et al. .......... 455/3.05 |
| 2005/0215204 | A1 | 9/2005 | Wallace et al. ................ 455/78 |

FOREIGN PATENT DOCUMENTS

| | | |
|---|---|---|
| EP | 0 682 458 A2 | 5/1995 |
| EP | 0 944 175 A1 | 3/1998 |
| EP | 1 158 686 A1 | 11/2001 |
| EP | 1180851 A2 | 2/2002 |
| GB | 2360655 A | 9/2001 |
| WO | WO01-06669 A1 | 1/2001 |
| WO | WO 01/39576 A1 | 6/2001 |
| WO | WO2004-074862 A2 | 9/2004 |
| WO | WO 2004/074862 A2 | 9/2004 |
| WO | WO 2004/098085 | 11/2004 |
| WO | WO2005-104390 A1 | 11/2005 |

OTHER PUBLICATIONS

Scott, J. H., "The How and Why of COFDM", Tutorial-COFDM, EBU Technical Review—Winter 1998, pp. 1-14.

Eriksson, M., "Evaluation of Packet-by-Packet Downlink Radio Resource Management Schemes", VTC'01, Rhodes, Greece, Jun. 6-9, 2001.

Hamacher, C., "Spectral Coexistence of DVB-T and UMTS in a Hybrid Radio System".

Huschke, J. et al., "Guard Band Coordination of Areas with Differing Spectrum Allocation".

Eriksson, M., "Dynamic Single Frequency Networks", IEEE Journal on Selected Areas in Communications, vol. 19, No. 10, Oct. 2001, pp. 1905-1914.

Nokia Connecting People, "Future Technology STC", Copyright© Nokia Multimedia Terminals Oy 2000.

"Digital Video Broadcasting (DVB); Framing Structure, channel coding and modulation for digital terrestrial television." Draft EN 300 744 v1.2.1 (Jan. 1999) European Standard, pp. 1-47, Telecommunications Series. European Broadcasting Union.

Junko Yoshida, "Nokia Redefines Digital TV as a Mobile Device" pp. 1-4, EE Times Apr. 22, 2002.

Hamacher, C., "Spectral Coexistence of DVB-T and UMTS in a Hybrid Radio System" IST Mobile Communication Summit, Sep. 1, 2001, XP-002333828, 6 pgs.

* cited by examiner

INTEROPERABILITY IMPROVEMENT BETWEEN RECEIVERS AND TRANSMITTERS IN A MOBILE STATION

CROSS-REFERENCE TO RELATED APPLICATIONS

The present application is a continuation-in-part of U.S. patent application Ser. No. 11/020,981, filed on Dec. 22, 2004 now abandoned and a continuation-in-part of U.S. patent application Ser. No. 11/141,838, filed on May 31, 2005 now U.S. Pat. No. 7,477,915.

TECHNICAL FIELD

This invention relates generally to mobile communications and, more specifically, relates to receiving and transmitting in a mobile station.

BACKGROUND OF THE INVENTION

Terrestrial digital video broadcasting (DVB-T) was first adopted as a standard in 1997, and has been deployed throughout many areas of the world. DVB-T offers about 24 megabits per second (Mb/s) data transfer capability to a fixed receiver, and about 12 Mb/s to receivers in mobile stations. Mobile stations including such mobile receivers have been made and are able to receive the DVB-T signals.

While DVB-T allows high quality video broadcasting to be delivered to various devices, the DVB-T standard has certain problems with respect to mobile stations. One such problem is power usage, as mobile stations that implement DVB-T tend to consume too much power. Since mobile stations are battery powered unless plugged into a secondary power source, power usage is a critical design element. In response to this power usage and other effects of DVB-T, the DVB-H (a version of DVB for handheld devices) standard was created. DVB-H offers, among other things, reduced power usage as compared to DVB-T.

Because of the benefits of DVB-H over DVB-T, DVB-H is beginning to make inroads into the mobile station market. For example, Crown Castle and Nokia are piloting DVB-H technology in the United States in order to bring television (TV)-like services to mobile devices. The pilot has started in October, 2004 in the Pittsburgh, Pa. area, and the pilot aims to prove and test the feasibility of DVB-H technology and related service systems in the United States.

While DVB-H is an improvement over DVB-T, DVB-H also causes certain problems. For instance, a mobile station typically will contain at least one transmitter that transmits using one or more frequency bands. The DVB-H receiver also receives in a frequency band that is different than the one or more frequency bands used by any transmitter in the mobile station. For instance, certain mobile stations can support the global system for mobile communications (GSM) standard, and the frequency bands used by a GSM transmitter are different from the frequency band used by a DVB-H receiver. Nonetheless, transmitting using one frequency band can still cause interference in the frequency band used by the DVB-H receiver.

It would therefore be desirable to provide techniques that can reduce this interference and therefore improve interoperability between transmitters and receivers in a mobile station.

BRIEF SUMMARY OF THE INVENTION

In an exemplary embodiment, a mobile station is disclosed that includes a first antenna, at least one second antenna, and a receiver coupled to the first antenna. The receiver includes first control logic configured to generate a notification of the receiver being able to receive a reception frequency band. The mobile station also includes a transmitter coupled to the at least one second antenna and the receiver. The transmitter communicates radio frequency (RF) signals in a transmission frequency band over an RF transmit path to the at least one second antenna. The transmitter includes a tunable filter coupleable to the RF transmit path, and second control logic coupled to the tunable filter and configured to adjust at least one characteristic of the tunable filter based at least in part on the notification. The adjustment is performed to reduce, when the tunable filter is coupled to the RF transmit path, interference caused by transmission in the transmission frequency band with reception in the reception frequency band.

In another exemplary embodiment, in a mobile station including a first antenna and at least one second antenna, a method is disclosed for operating a transmitter coupled to the at least one second antenna in combination with a receiver coupled to the first antenna. The method includes generating a notification of the receiver being able to receive a reception frequency band from the first antenna. The method also includes, based at least on the notification, adjusting characteristics of a tunable filter coupleable to an RF transmit path of the transmitter. The adjustment is performed to reduce, when the tunable filter is coupled to the RF transmit path, interference caused by transmission in a transmission frequency band with reception in the reception frequency band. The method also includes transmitting information in the transmission frequency band through the RF transmit path, with the tunable filter coupled thereto, to the at least one second antenna.

In another embodiment, a signal bearing medium (e.g., a program product) includes a program of machine-readable instructions executable by an apparatus to perform operations for operating a transmitter coupled to at least one second antenna in combination with a receiver coupled to a first antenna. The operations include generating a notification of the receiver being able to receive a reception frequency band from the first antenna. The operations further include, based at least on the notification, adjusting at least one characteristic of a tunable filter coupleable to an RF transmit path of the transmitter. The adjustment is performed to reduce, when the tunable filter is coupled to the RF transmit path, interference caused by transmission in a transmission frequency band with reception in the reception frequency band. The operations also include causing information to be transmitted in the transmission frequency band through the RF transmit path, with the tunable filter coupled thereto, to the at least one second antenna.

In yet another exemplary embodiment, an apparatus includes an input for receiving a notification of a receiver being able to receive a reception frequency band. The apparatus also includes a tunable filter and at least one connection for coupling the tunable filter to an RF transmit path of a transmitter. The apparatus also includes control logic coupled to the tunable filter and to the input. The control logic is responsive to at least the notification to adjust at least one characteristic of the tunable filter. The adjustment is performed to reduce, when the tunable filter is coupled to the RF transmit path, interference caused by transmission by the transmitter in a transmission frequency band with reception in the reception frequency band.

BRIEF DESCRIPTION OF THE DRAWINGS

The foregoing and other aspects of embodiments of this invention are made more evident in the following Detailed Description of Exemplary Embodiments, when read in conjunction with the attached Drawing Figures, wherein.

DETAILED DESCRIPTION OF EXEMPLARY EMBODIMENTS

Figure 1:
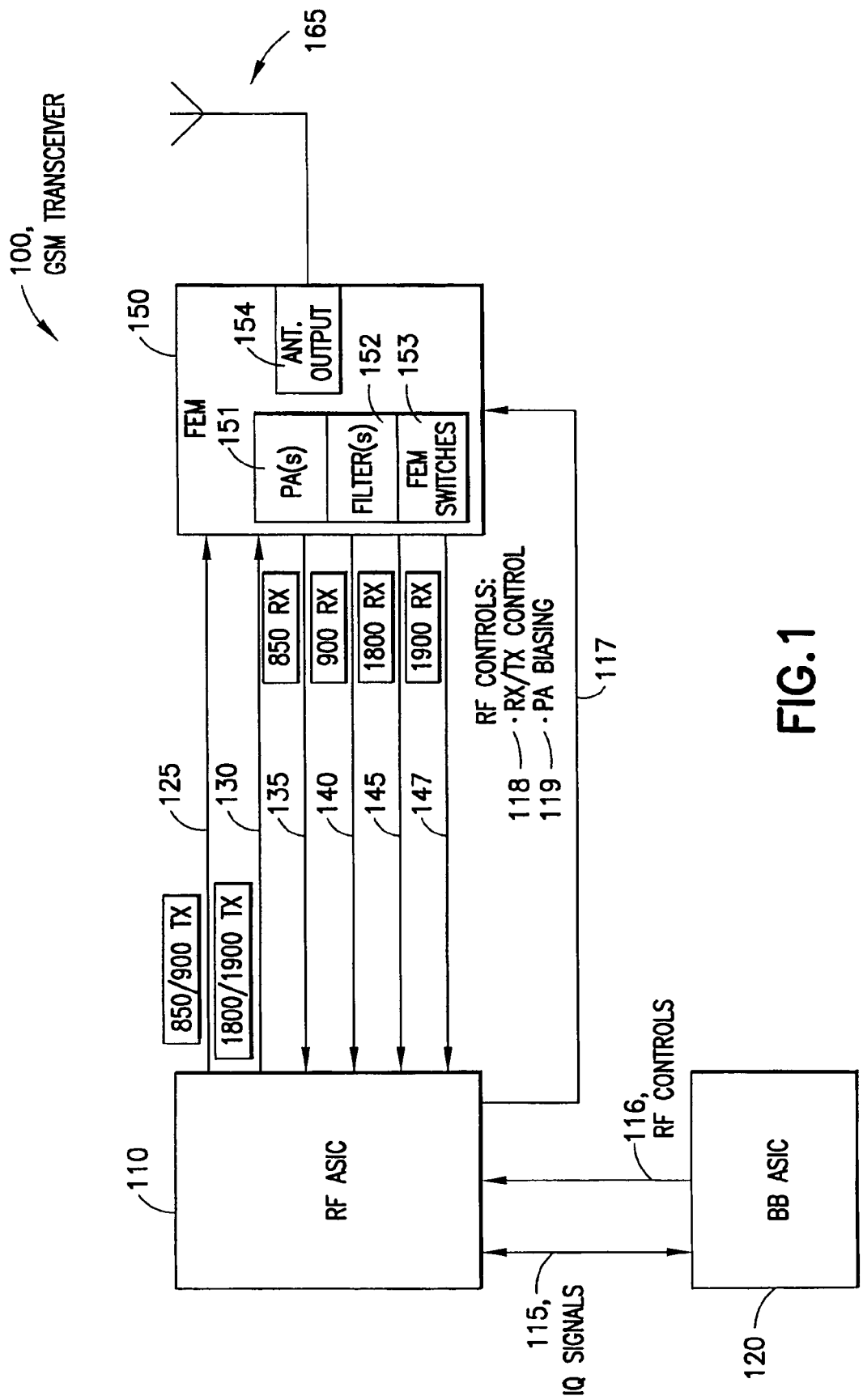
FIG. 1 is a block diagram of a GSM transceiver.

As previously described, the combination of a transmitter and a receiver in a mobile station can be problematic. A further introduction to these problems will now be given. In the examples below, the mobile station will be considered to have a GSM transmitter and a DVB-H receiver in the same mobile station, although the present invention is not limited to this configuration. A mobile station is any portable device having wireless capability, such as a cellular phone, a personal digital assistant (PDA) with cellular or bluetooth capability, and the like. The mobile station will typically be battery powered.

In terms of what an operator of the mobile station could experience while watching digital video using the mobile station, there are several factors to consider. The business case of the DVB-H operator is based on good quality video performance, and cellular connection is not allowed to effect video quality. Nonetheless, the mobile station performs cellular operations when delivering back channel information to the interactive DVB-H media and when the mobile station needs to connect to the base station. The mobile station needs to connect to the base station periodically.

When the mobile station transmits at a cellular frequency, DVB-H reception quality is decreased. This decrease can be seen as video flow being not constant or there being blurs in the picture. A DVB-H frequency band has a number of sub-carriers. The cellular transmission may destroy all sub-carriers at the same time or may destroy certain ones of the sub-carriers. For instance, GSM transmissions occur 4.6 milliseconds (ms) apart with 577 microseconds (μs) transmission time period. The DVB-H time duration of the useful part of a symbol without guard interval is for example for 5 MHz channel bandwidth, in 2 k mode 358.4 μs, for 4 k mode 716.8 μs, and 8 k mode 1433.6 μs.

The recovery time from the cellular connection disturbance is not known, but this may be quite long. The recovery time is at least partially dependent on the algorithm for the automatic gain control (AGC) of the DVB-H receiver and the performance of the AGC with strong signals and humping wideband noise.

The interoperability problem between DVB-H in United States and the cellular frequency bands will be one of the biggest issues after service using DVB-H is launched. Both cellular bands for reception of GSM will generate problems to DVB-H band which is located between those in frequency domain. The following table illustrates exemplary transmission and reception bands for GSM and DVB-H, where "MHz" is megahertz, "U.S." is United States, and "E.U." is European Union.

| | | |
|---|---|---|
| Lower GSM Frequency Band in U.S. (GSM850) | Transmission Reception | 824-849 MHz 869-894 MHz |
| Lower GSM Frequency Band in EU (GSM900) | Transmission Reception | 880-915 MHz 935-960 MHz |
| Higher GSM Frequency Band in U.S. (GSM1900) | Transmission Reception | 1850-1910 MHz 1930-1990 MHz |
| Higher GSM Frequency Band in EU (GSM1800) | Transmission Reception | 1710-1785 MHz 1805-1880 MHz |
| Frequency band in EU (WCDMA2100) | Transmission Reception | 1920-1980 MHz 2110-2170 MHz |
| DVB-H Band in U.S. | Reception | 1670-1675 MHz |
| DVB-H Band in E.U. | Reception | 470-702 MHz |

The higher US GSM frequency band will generate wide-band noise, which is higher than the minimum DVB-H signal level. The higher GSM frequency band (GSM1900, typically called the "1900 frequency band" herein) noise at the DVB-H frequency band is −121 dBm/Hz. The required noise level at the minimum DVB-H signal level is less than −169 dBm/Hz. The difference between actual and required levels is 48 dB.

The assumption is that noise level is flat and the same level as the GSM reception band noise level.

In the European Union DVB-H version, the reception band is on the lower side of the GSM frequency band (GSM900, which is a transmission frequency band of 880-915 MHz) and the reception frequency band is far enough that 900 frequency band transmission is not band-blocking the DVB-H receiver. Nonetheless, the wide band noise may be a problem also in European DVB-H reception.

In terms of the U.S. standards, the 850 frequency band transmission will generate a second harmonic, which will be at the U.S. DVB-H reception frequency band of 1670-1675 MHz. Also, the 850 frequency band transmission will generate wide band noise to the U.S. DVB-H frequency band. The most difficult frequencies are 835.0-837.5 MHz in transmission, since these frequencies generate harmonics directly on top of the U.S. DVB-H frequency band.

The spurious frequencies near the DVB-H reception channel will be problematic since the channel filter is not filtering nearby spurious signals effectively from the DVB-H reception signal, because the receiver channel selection is designed so that next channel will be, depending on geographical area, either 5, 6, 7, or 8 MHz apart from the desired received signal. If there are interference signals nearer than channel raster 5, 6, 7, or 8 MHz then those interference signals may cause problems since the channel filter does not filter those completely. A 2.5 MHz band will include 12.5 GSM RF channels, which will create co-channel interference.

The same problem will occur with other U.S. cellular systems like code-division multiple access (CDMA) and time-division multiple access (TDMA). This is due to fact that spurious signal level requirement is −13 dBm by the Federal Communications Commission (FCC) and in GSM standard the spurious requirement is −30 dBm. In CDMA, transmission is always on, thus DVB-H reception is constantly distorted when CDMA is operating with mentioned difficult RF frequencies or near by frequencies.

In current DVB-H accessories (such as a video streaming device by Nokia called SU-22), this receiver desensitizing effect can be noticed when GSM transmission is on.

Possible solutions to these problems are as follows. One possible solution is increased filtering at the 850 and 1900 frequency band transmission signal paths. This is not a good solution in coming GSM transmitter architectures, since there will be only one low frequency band (e.g., the 850 and 900 frequency bands will be combined together) and one high frequency band (e.g., the 1800 and 1900 frequency bands will be combined together) will be used. Therefore, if for instance more filtering is added for the 1900 frequency band signals (which are used for transmission), then the 1800 frequency band signals are also filtered (which are used for reception).

For instance, FIG. 1 shows an exemplary GSM transceiver 100 of a mobile station. The GSM transceiver 100 is used for both transmission and reception of GSM signals. The GSM transceiver 100 comprises an RF application-specific integrated circuit (ASIC) 110, a base-band (BB) ASIC 120, and a front-end module (FEM) 150. The BB ASIC 120 and RF ASIC 110 communicate through in-phase and quadrature (IQ) signals 115 and RF controls 116. The RF ASIC 110 transmits two frequency bands, the 900 frequency band (e.g., in the 850/900 TX 125) and the 1900 frequency band (e.g., in the 1800/1900 TX 130) to the FEM. The FEM comprises one or more power amplifiers (PAs) 151, one or more filters 152 (e.g., harmonic filters), FEM switches 153, and an antenna output 154, coupled to antenna 165. The filters 152 can perform reception pre-filtering, and the FEM 150 communicates four reception frequency bands, the 850 RX 135, 900 RX 140, 1800 RX 145, and 1900 RX 147, to the RF ASIC 110. The FEM 150 and the RF ASIC 110 also communicate through RF controls 117, which include reception/transmission (RX/TX) control 118 and PA biasing 119. The RX/TX control 118 is a signal that indicates whether the FEM 150 is in a transmit (TX) or a reception (RX) mode. The PA biasing 119 is a signal that changes PA biasing of the one or more PAs 151.

As FIG. 1 shows, if more filtering is added for signals on the 1900 frequency band, then signals on the 1800 frequency band are also filtered. Similarly, if filtering is added for signals on the 900 frequency band, then signals on the 850 frequency band will also be filtered.

Yet another problem is as follows. The GSM 1800 transmission frequency band is from 1710 to 1785 MHz. The U.S. DVB-H reception frequency band is therefore about 40 MHz lower than the lowest GSM1800 transmission frequency band. The required filtering is about 50 dB, which means also noticeable loss at the GSM1800 lowest channel powers. The current trend is increase radiated terminal output powers and thus extra loss after the PA 151 is not beneficial if the loss occurs all the time. For instance, a frequency filter (e.g., at 1800/1900 MHz) with pass band to stop band roll-off like 35-40 MHz has easily a remarkable insertion loss, that degrades both transceiver transmit path and receiver path.

If the filtering is done prior to the PA 151, this does not solve the wide band noise problem because the PA 151 is significant source of noise. For instance, at the 850 frequency band, harmonics filtering prior to the PA 151 will not help the situation, since PA 151 is the main contributor to the harmonics.

Exemplary embodiments of the present invention improve interoperability between receivers and transmitter in a mobile station. In an aspect of the invention, filtering is used to filter certain frequencies of the transmission frequency band. In an exemplary embodiment, the filtering is performed only when the DVB-H receiver is able to receive, and this limits power loss due to filtering. In another aspect of the invention, in response to the transmitter transmitting (e.g., which can include preparations for transmitting), the DVB-H receiver modifies one or more inputs used by a device in the DVB-H receiver. The modification is performed to improve reception of DVB-H information while the transmitter is transmitting.

Figure 2:
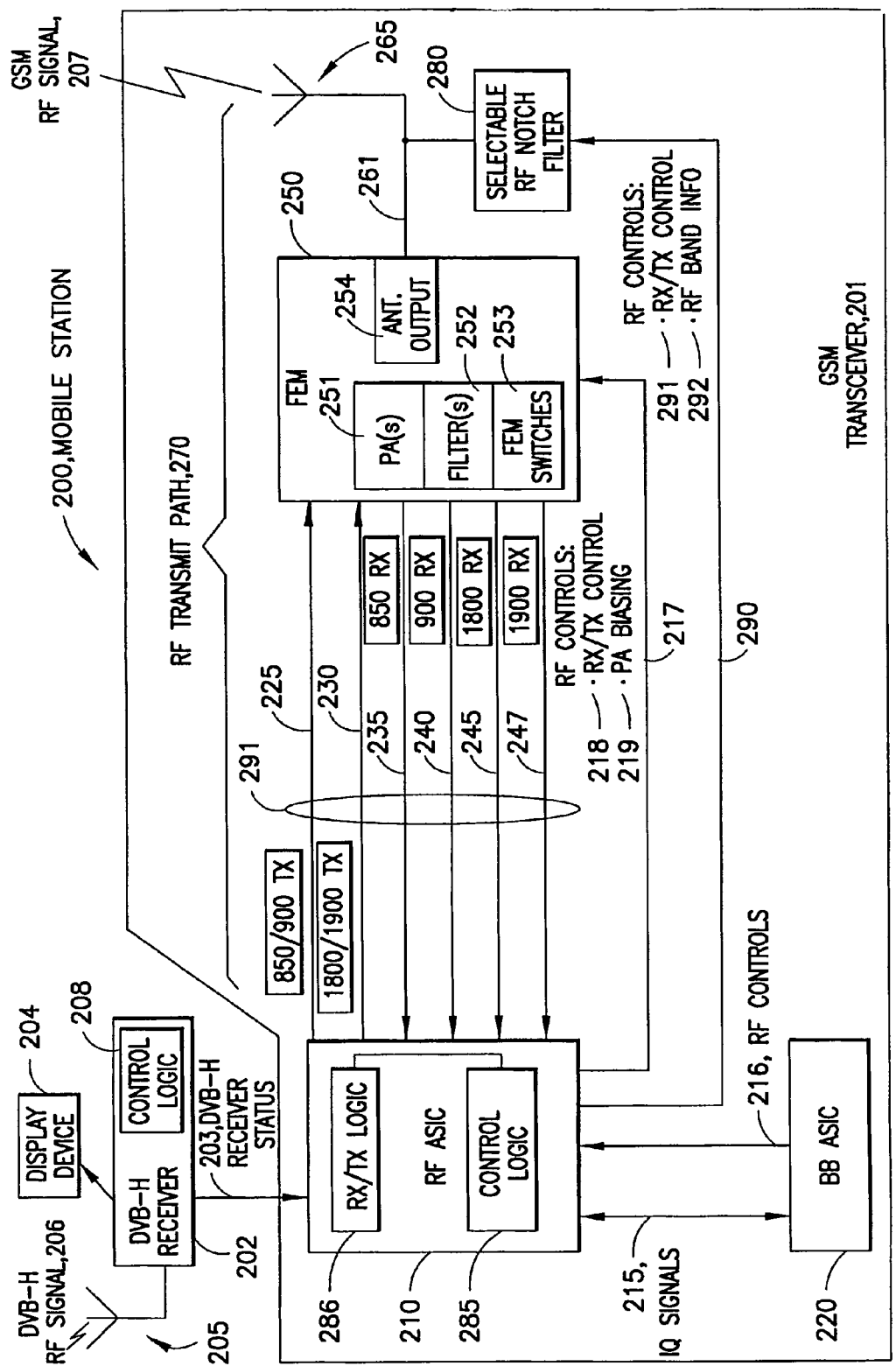
FIG. 2 is a block diagram of a mobile station in accordance with an exemplary embodiment of the present invention.

Referring now to FIG. 2, this figure shows a mobile station 200 in accordance with an exemplary embodiment of the present invention. The mobile station 200 comprises a GSM transceiver 201, a DVB-H receiver 202, a display device 204, and an antenna 205. The DVB-H receiver 208 comprises control logic 208 that controls operations of the DVB-H receiver 208, such as generating the DVB-H receiver status signal 203. The display device 204 displays at least information from the DVB-H receiver 202. The DVB-H receiver 202 is coupled to the RF ASIC 210 using DVB-H receiver status signal 203. The DVB-H receiver 202 receives a DVB-H RF signal 206 and converts this signal to information (not shown) suitable for display on the display device 204.

The exemplary GSM transceiver 201 is used for both transmission and reception of GSM RF signals 207 using antenna 265, but could be a transmitter only, if desired. The GSM transceiver 201 comprises an RF ASIC 210, a BB ASIC 220, a FEM 250, and a selectable RF notch filter 280, and the antenna 265. The antenna 265 need not be part of the GSM transceiver 201. The BB ASIC 220 and RF ASIC 210 communicate through in-phase and quadrature (IQ) signals (generally: I- and Q-signals comprise information that is to be transmitted or received) 215 and RF controls 216. The RF ASIC 210 is an RF device that creates and communicates RF signals using two frequency bands, the 850/900 TX 225 and the 1800/1900 TX 230 to the FEM. Note that the RF ASIC 210 may comprise multiple RF devices that create and communicate the RF signals. The FEM comprises one or more PAs 251, one or more filters 252, FEM switches 253, and an antenna output 254, coupled to antenna 265. The filters 252 can perform reception pre-filtering, and the FEM 250 communicates four reception frequency bands, the 850 RX 235, 900 RX 240, 1800 RX 245, and 1900 RX 247, to the RF ASIC 210. Typically signals 225, 230, 235, 240, 245, and 247 are individual signal lines. It should be noted that the frequency bands 225, 230, 235, 240, 245, and 247 are can be communicated using a bus 291. Typically, only one of the frequency bands 225-247 occupies the bus 291 at one time and the bus is made to hold only signals from a currently selected one of the frequency bands 225-247.

The FEM 250 and the RF ASIC 210 also communicate through RF controls 217, which include reception/transmission (RX/TX) control 218 and PA biasing signal 219. The RX/TX control 218 is a signal that indicates whether the FEM 250 is to be in a transmit (TX) or a reception (RX) mode. The PA biasing signal 219 is a signal that changes PA biasing of the one or more PAs 251. The RF ASIC 210 transmits either the 850/900 TX 225 or the 1800/1900 TX 230 frequency bands to the antenna 265 using the RF transmit path 270. The RF transmit path 270 is any path through which RF signals may be routed for transmission. For instance, when the GSM transceiver 201 is transmitting using the 850/900 TX 225 frequency band, the RF transmit path 270 comprises the bus 291, the FEM 250, and the antenna coupling 261, and, optionally, the antenna 265. The RF ASIC 210 communicates to the selectable RF notch filter 280 using the RF controls 290, which include the RX/TX control 291 and RF band information 292. The RX/TX control 291 is a signal that indicates whether the FEM 250 is to be in a transmit (TX) or a reception (RX) mode, and may be a copy of the RX/TX control 218 if desired. Illustratively, the RF band information 292 is a signal having information used to determine which of the 850, 950, 1800, and 1900 frequency bands is being used.

Filtering of the transmission signals of one of the 850, 950, 1800, and 1900 frequency bands is done adaptively by using transmission on/off information (e.g., in the RX/TX control 291) and operating frequency band information (e.g., in the RF band information 292). In an exemplary embodiment, the filter used in the selectable RF notch filter 280 is a branch-selectable notch filter, which has multiple selections with multiple notch rejection specifications. Exemplary selectable RF notch filters 280 are shown in FIGS. 3-6A.

The DVB-H receiver status signal 203 can be used to determine when filtering is performed. In one exemplary embodiment, the DVB-H receiver status signal 203 is a signal indicating whether the DVB-H receiver 202 is in a reception mode. In response to the DVB-H receiver being in a reception mode, the GSM transceiver 201 performs filtering of transmitted GSM signals. In another exemplary embodiment, the DVB-H receiver 202 could be contained in a removable module (not shown). When the removable module is coupled to the mobile station 200, the DVB-H receiver status signal 203 indicates that the removable module is coupled to the mobile station 200, and the GSM transceiver 201 performs filtering of transmitted GSM signals in response to the DVB-H receiver status signal 203. Note that the DVB-H receiver status signal 203 could be determined through a query by the RF ASIC 210 to the DVB-H receiver 202.

When notch filtering is used, then higher losses can be expected in the signal communicated on the RF transmit path 270 to the antenna 265. Thus, notch filtering means lower radiated output power. For this reason, the extra notch filtering, in an exemplary embodiment, is used only when needed.

Consequently, a notch is selected based on operating frequency band and a notch is typically selected only when transmission is on. The selectable RF notch filter 280 modifies the RF transmit path 270 to couple one or more filters to or decouple one or more filters from the RF transmit path 270. Since extra filtering increases loss to the RF transmit path 270, filtering is removed when GSM is in reception mode. This way, GSM sensitivity can be maintained.

The notch filtering in the 850 frequency band is typically performed for the second harmonic rejection and may be performed for wide band noise filtering (e.g., noise that is converted to 1670-1675 MHz frequency band). In 900/1800/1900 frequency bands, the filtering is done to suppress wide band noise. Noise from 900 MHz for EU DVB-H frequency band, and noise from 1800/1900 MHz to US DVB-H frequency band are wide band noise at their nature. A "notch filter" in this context is, e.g., a filter with a bandwidth sufficient to cover a DVB-H frequency band. This kind of filter can be referred as notch-filter, and noise can be referred as wideband noise. It is not an intention (though it is possible) to filter wideband, just a DVB-H frequency band (e.g., only US or EU) or frequency bands (e.g., both US and EU).]

Furthermore, the PA 251 can be linearized by changing the PA biasing signal 219 to cause the PA 251 to perform closer to or at class A operation. Typically, this means a value of current on the PA biasing signal 219 would be increased. Class A operation should reduce the magnitude of the harmonics. This more linear operation will consume more power and generate more heat, but this more linear mode is needed only when the GSM transceiver 201 is transmitting (e.g., which can include preparations to transmit) at the same time a DVB-H module is in reception mode. This way total current consumption is not increased significantly.

The control logic 285, as part of the RF ASIC 210, communicates the RF controls 290 to the selectable RF notch filter 280. The control logic 285 also, in one exemplary embodiment, controls operations of the GSM transceiver 701. It should be noted that a portion or all of the control logic 285 may reside in locations other than the RF ASIC 210, such as being distributed between the RF ASIC 210 and the BB ASIC 220 or being its own module separate from the RF ASIC 210 or the BB ASIC 220. Additionally, the control logic 285 can adjust the PA biasing signal 219. Note that a control logic portion can be added to the selectable RF notch filter 280, if desired, so that the selectable RF notch filter 280 will determine, using signals from the RF ASIC 210 and the DVB-H receiver 208, what filter should or should not be coupled to the antenna coupling 261. The RX/TX logic 286 determines whether the RF ASIC 210 is in a transmission or reception mode and informs the control logic 285 of the mode. The RX/TX logic 286 (e.g., and the control logic 285) would typically be part of control logic 285 for the RF ASIC 210.

Although the RF ASIC 210, BB ASIC 220, and FEM 250 are shown as being separate, portions or all of the three may be combined or further sub-divided. Additionally, some or all of the functionality of the three may be performed by processors such as a digital signal processor (DSP), hardware such as very large scale integrated circuits (VLSI), or programmable logic devices (e.g., using read only memories) such as field programmable gate arrays (FPLGA), or some combination of these or any other suitable device. The signals herein may be, for instance, signals that travel on conductive elements, such as traces or wires, or may be one or more messages that are passed between software modules.

Figure 3:
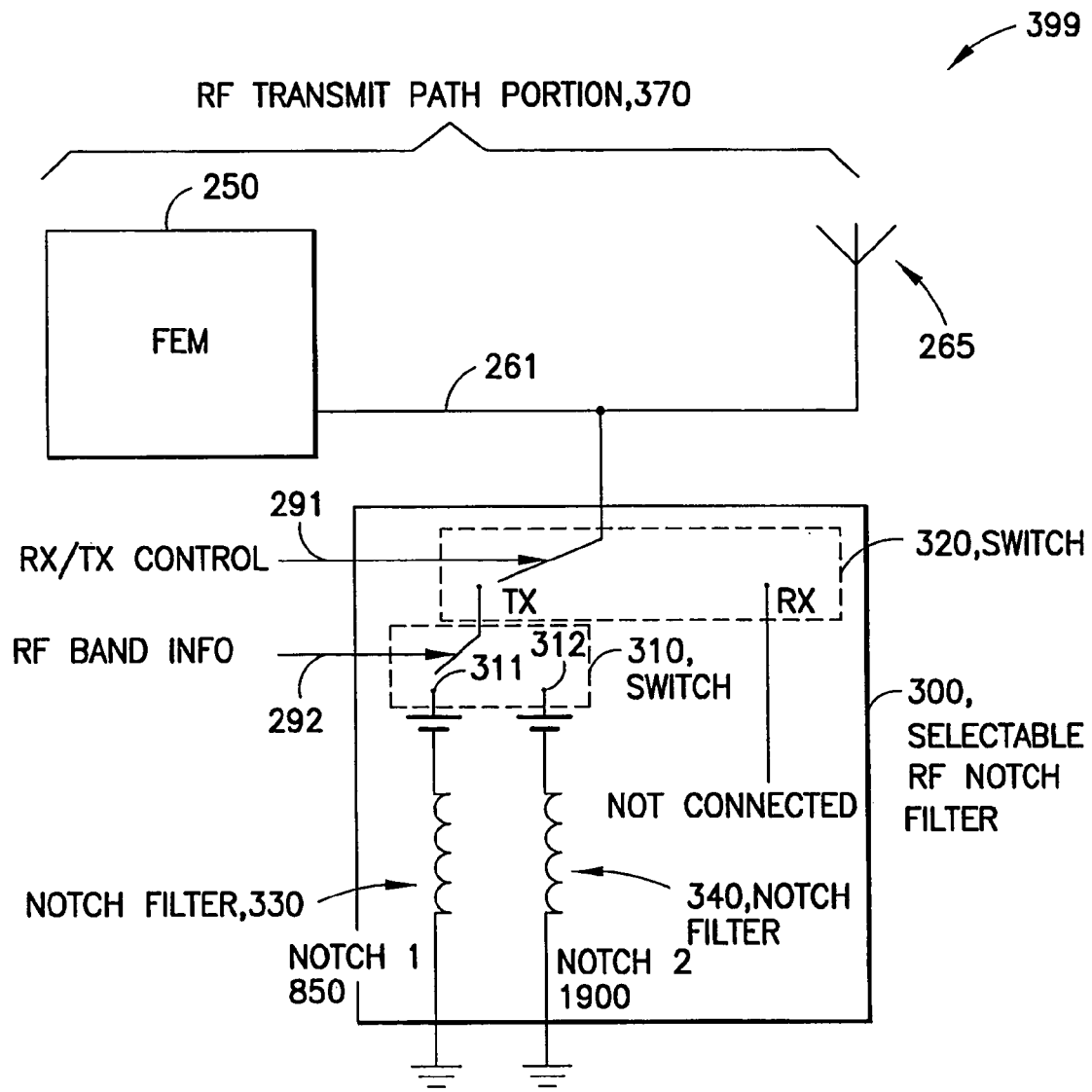
FIGS. 3-6A are block diagrams of exemplary portions, including RF transmit paths, of the mobile station of FIG. 2 and are used to illustrate filtering of GSM transmission signals.

Referring now to FIG. 3, a possible portion 399, including one exemplary RF transmit path portion 370, of the mobile station 200 of FIG. 2 is shown. RF transmit path portion 370 is a portion of RF transmit path 270. The portion 399 comprises the FEM 250, the antenna coupling 261, the selectable RF notch filter 300, and optionally the antenna 265. The selectable RF notch filter 300 comprises a switch 320 and a switch 310. In response to RX/TX control 291, the switch 320 switches between the RX connection (e.g., when the GSM transceiver 201 is in a reception mode) and the TX connection (e.g., when the GSM transceiver 201 is in a transmission mode). In response to the RF band information 292, the switch 310 switches between connection 311 (e.g., when the GSM transceiver 201 is transmitting using the GSM 850 frequency band), which couples a notch filter 330 to the RF transmit path portion 370, and the connection 312 (e.g., when the GSM transceiver 201 is transmitting using the GSM 1900 frequency band), which couples a notch filter 340 to the RF transmit path portion 370. Note that for the EU DVB-H system: the kind of functionality in FIG. 3 may be used at GSM 900 and 1800.

Thus, there are three different options for notch filter selection based on transmission or reception and operating frequency band:

Notch 1 (i.e., notch filter 330) option: Used when the GSM 850 frequency band is being used for transmission, and the filtering is performed for second harmonic and wide band noise filtering;

Notch 2 (i.e., notch filter 340) option: Used when the GSM 1900 frequency band is being used for transmission, and the filtering is performed for wideband noise filtering; and Not connected (i.e., the RX connection in switch 320, which connects to the not connected terminal 321) option: Used when the GSM transceiver 201 is in a reception mode. The not connected option does not add extra loss to the RF transmit path portion 370 and thus receiver sensitivity can be maintained.

The notch filters 330, 340 could be realized, for instance, with ceramic components or bulk acoustic wave (BAW) components, or micro-electromechanical switches (MEMS). The notch filters 330, 340 may also be realized using surface-mount devices (SMDs).

Figure 4:
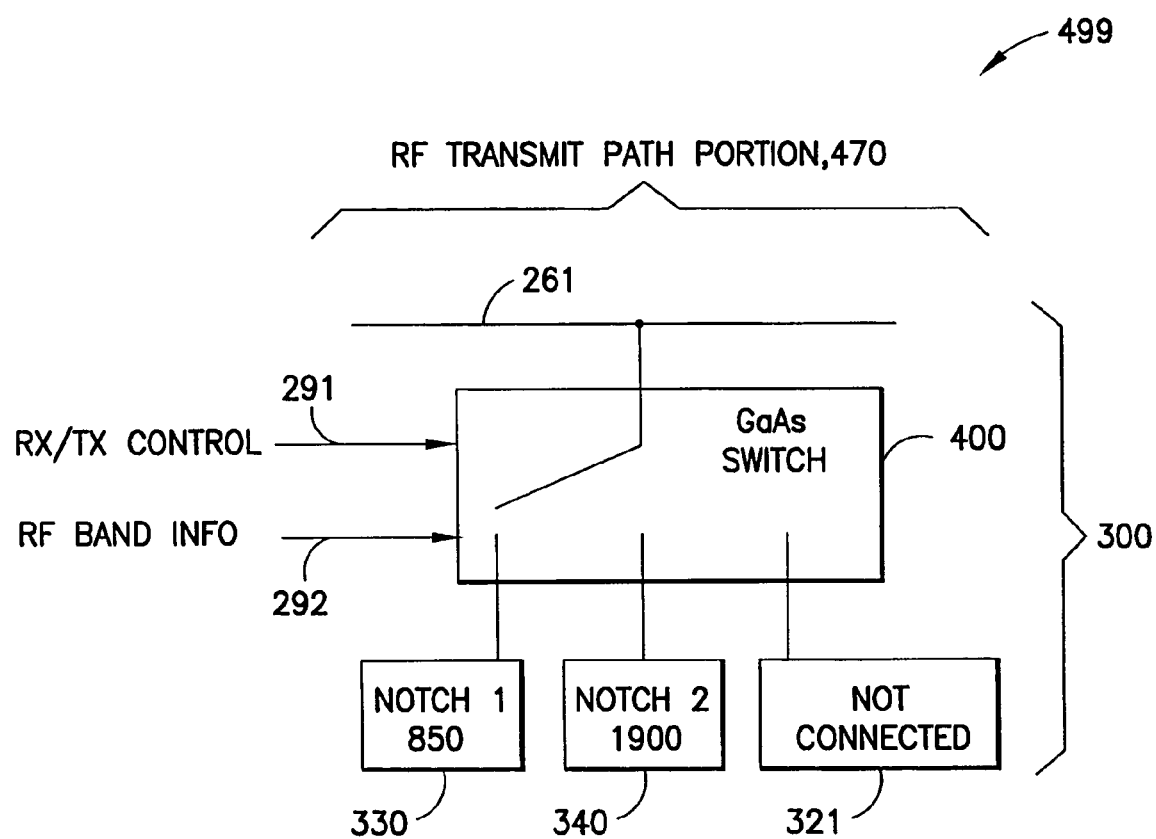

FIG. 4 shows another possible exemplary portion 499, including the RF transmit path portion 470, of the mobile station 200 of FIG. 2. Transmit path portion 470 is a portion of the RF transmit path 270 of FIG. 2. The exemplary portion 499 comprises a gallium arsenide (GaAs) switch 300 having three positions. The GaAs switch 400 is responsive to the RX/TX control 291 and the RF band information 292 to select one of the switches. Note that the RX/TX control 291 and the RF band information 292 may be combined into two control signals if desired. The GaAs switch 400 has a first position that couples the notch filter 330 to the antenna coupling 261, a second position that couples the notch filter 340 to the antenna coupling 261, and a third position that couples a not connected terminal to the antenna coupling 261.

Figure 5:
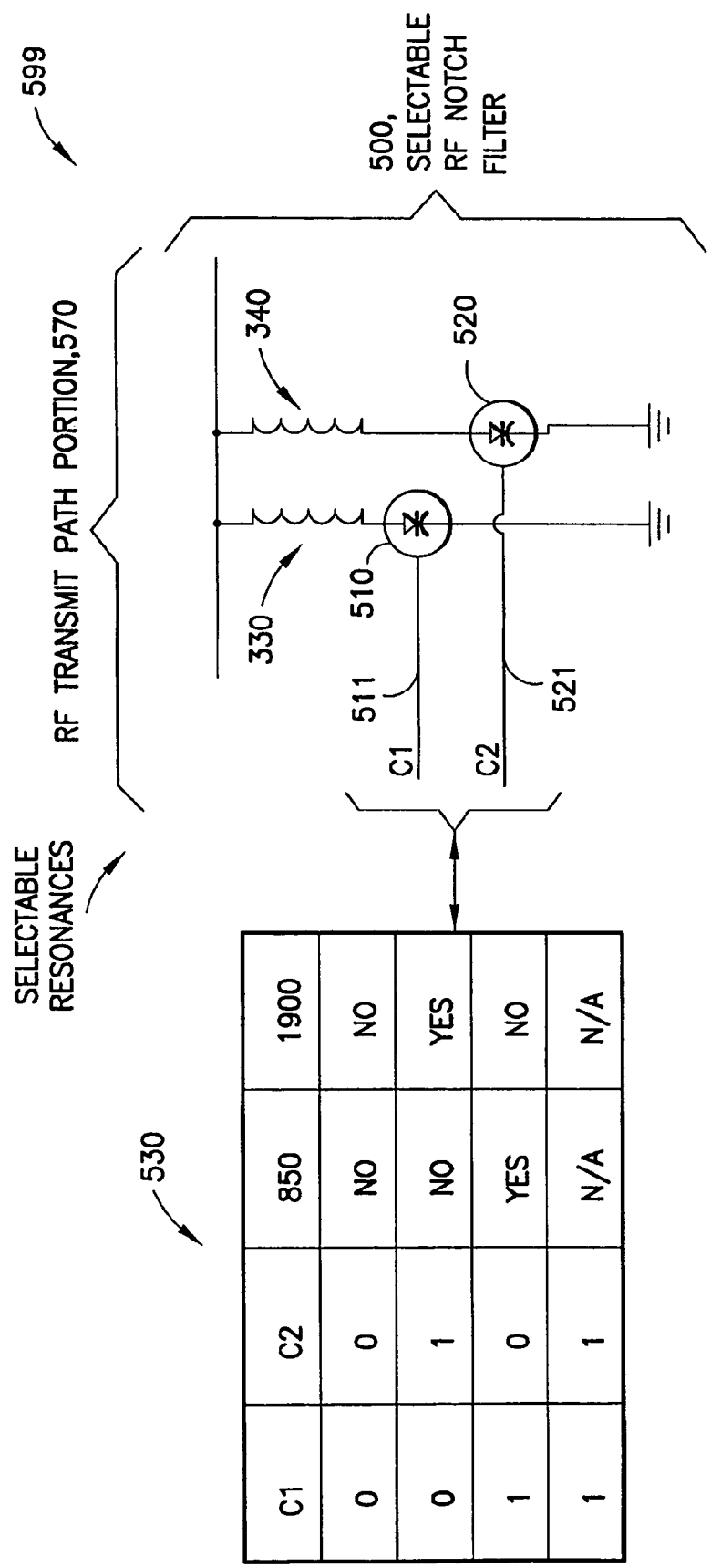

FIG. 5 shows another exemplary portion 599, including the RF transmit path portion 570, of the mobile station 200 of FIG. 2. Transmit path portion 570 is a portion of the RF transmit path 270 of FIG. 2. In the example of FIG. 5, the selectable RF notch filter 500 comprises two switches 510, 520, which could be GaAs FETs or PIN-diodes. Each switch 510, 520 has a corresponding control signal C1 511, C2 521. The control signals C1 511 and C2 521 are controlled as shown in table 530 of FIG. 5. In this example, when C1 511 is zero and C2 521 is zero, this is a not connected option. The Notch 1 option is chosen when C1 511 is one and C2 521 is zero, while the Notch 2 option is chosen when C1 511 is zero and C2 521 is one. One exemplary technique for generating the control signals C1 511 and C2 521 is by having the control logic 285 (see FIG. 2) generate the control signals C1 511 and C2 521 from data about whether the GSM transceiver 201 is transmitting and, if so, on what frequency band. The notch filters 330, 340 are selectable resonances. Note that control logic could be built into the selectable RF notch filter 500 so that the selectable RF notch filter generates the control signals C1 511 and C2 521 based on signals from the RF ASIC 210.

Figure 6:
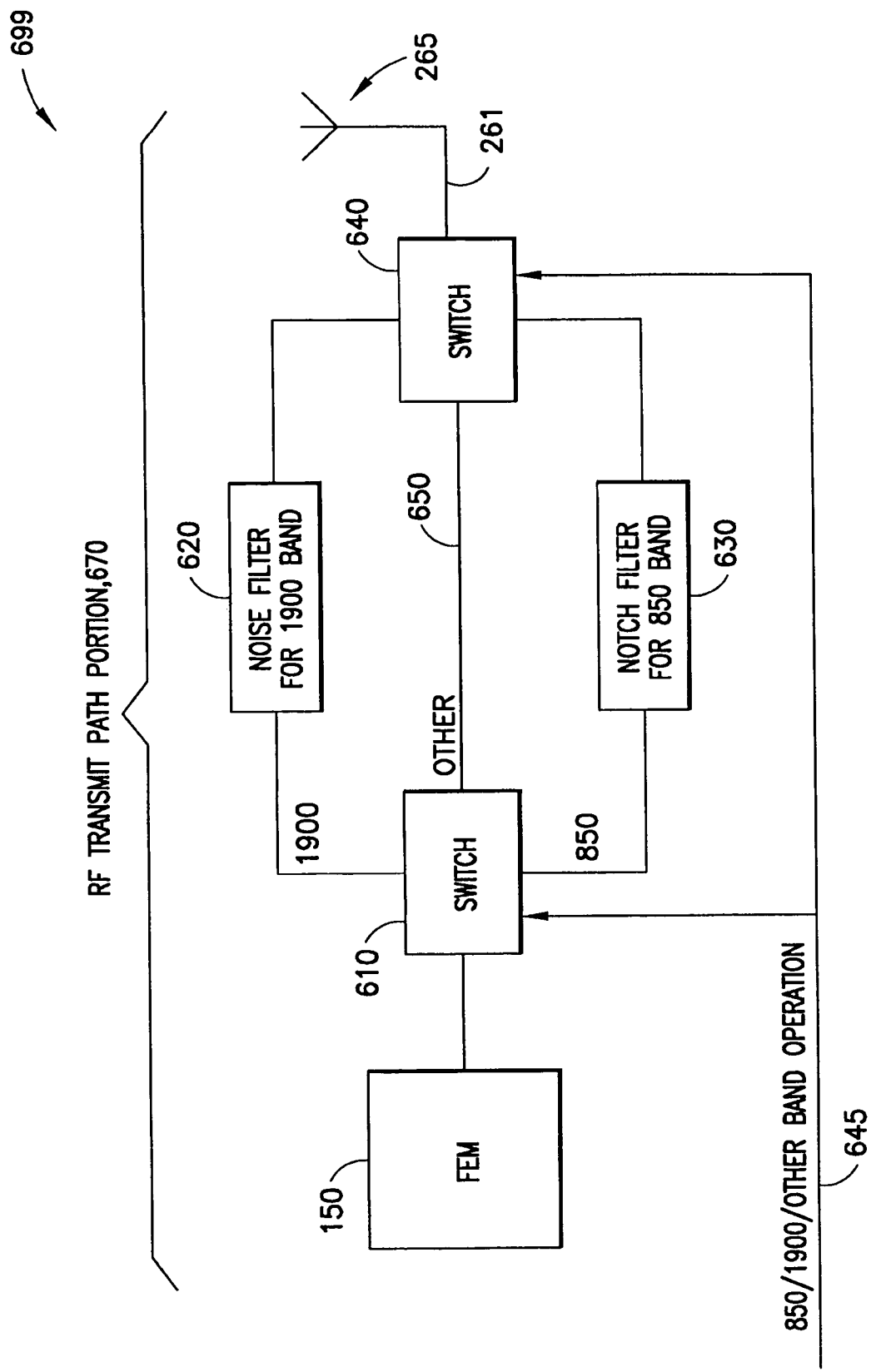

Turning now to FIG. 6, another exemplary possible portion 699, including RF transmit path portion 670, is shown of the mobile station of FIG. 2. The portion 699 comprises the FEM 150, two switches 610, 640, a noise filter 620 for the GSM 1900 frequency band, a notch filter 630 for the GSM 850 frequency band, a filtering control signal 645, the antenna coupling 261, and optionally the antenna 265. FIG. 6 illustrates an alternative proposal for a filter arrangement and is a filter bank approach. The switches 610 and 640 are responsive to the filtering control signal 645 to modify the transmit portion 670 to couple the noise filter 620 or notch filter 630 to the RF transmit path portion 670 or to uncouple the noise filter 620 and notch filter 630 from the RF transmit path portion 670 (e.g., using the unfiltered connection 650). When the GSM transceiver 201 is transmitting using the GSM 850 frequency band, the switches 610 and 640 couple the notch filter 630 to the RF transmit path portion 670. When the GSM transceiver 201 is transmitting using the GSM 1900 frequency band, the switches 610 and 640 couple the noise filter 620 to the RF transmit path portion 670. When the GSM transceiver 201 is transmitting on the GSM 900 or 1800 frequency bands or is receiving (e.g., or the DVB-H receiver 202 is not in a reception mode), the switches 610 and 640 couple the unfiltered connection 650 to the RF transmit path portion 670.

Figure 6A:
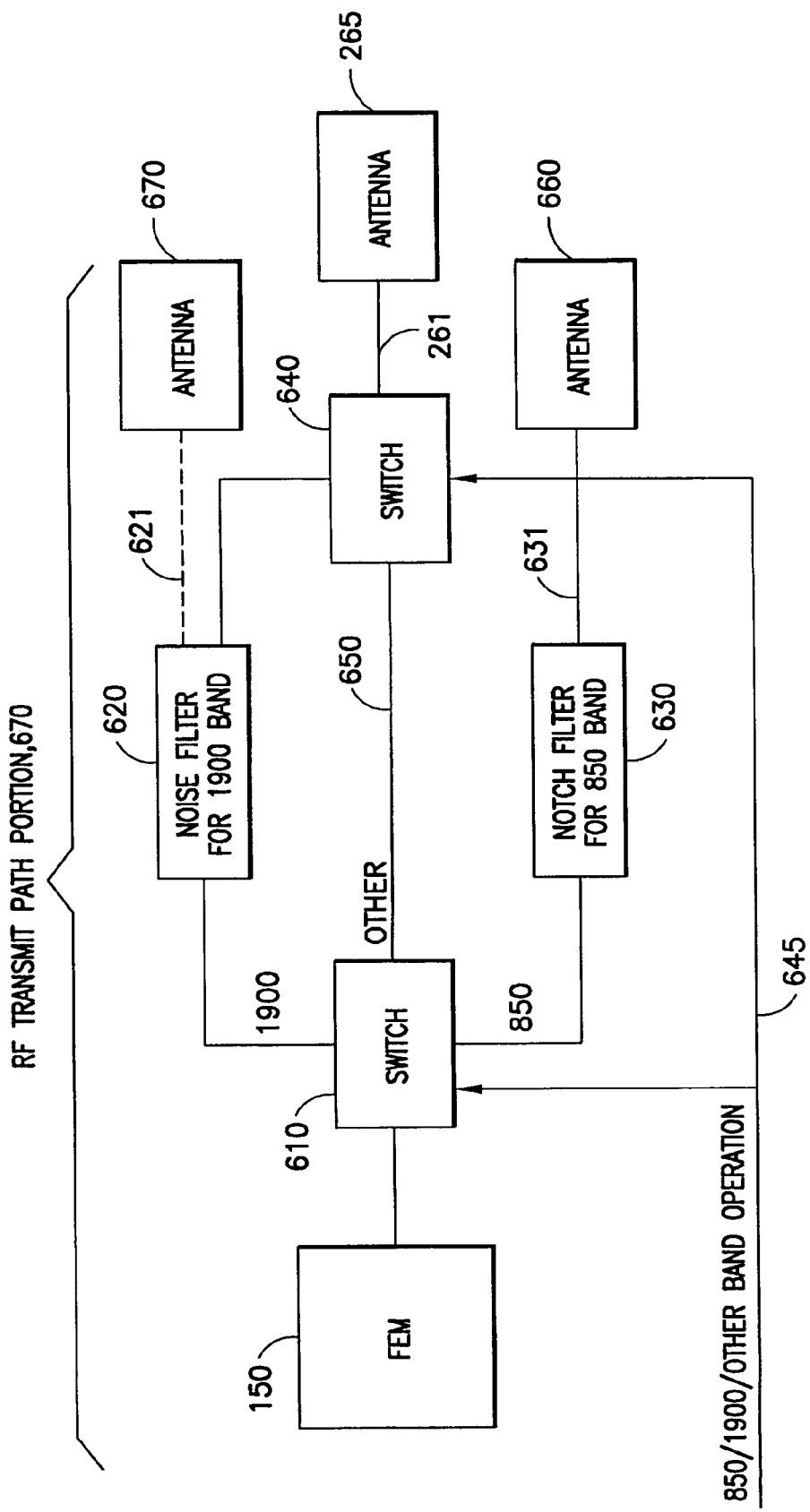

FIG. 6A is an alternative implementation for the radio transmitter presented in FIG. 6. One difference is the second antenna 660, which is connected to notch filter 630. When a filtered signal 631 is transmitted directly from filter 630 via antenna 660, then linearity and harmonic suppression can be maintained. Also transmitted output power can be increased by insertion loss of switch 640. Also a similar kind of extra antenna 670 can be connected to noise filter 620 and the same benefits would occur with the filtered signal 621.

Figure 7:
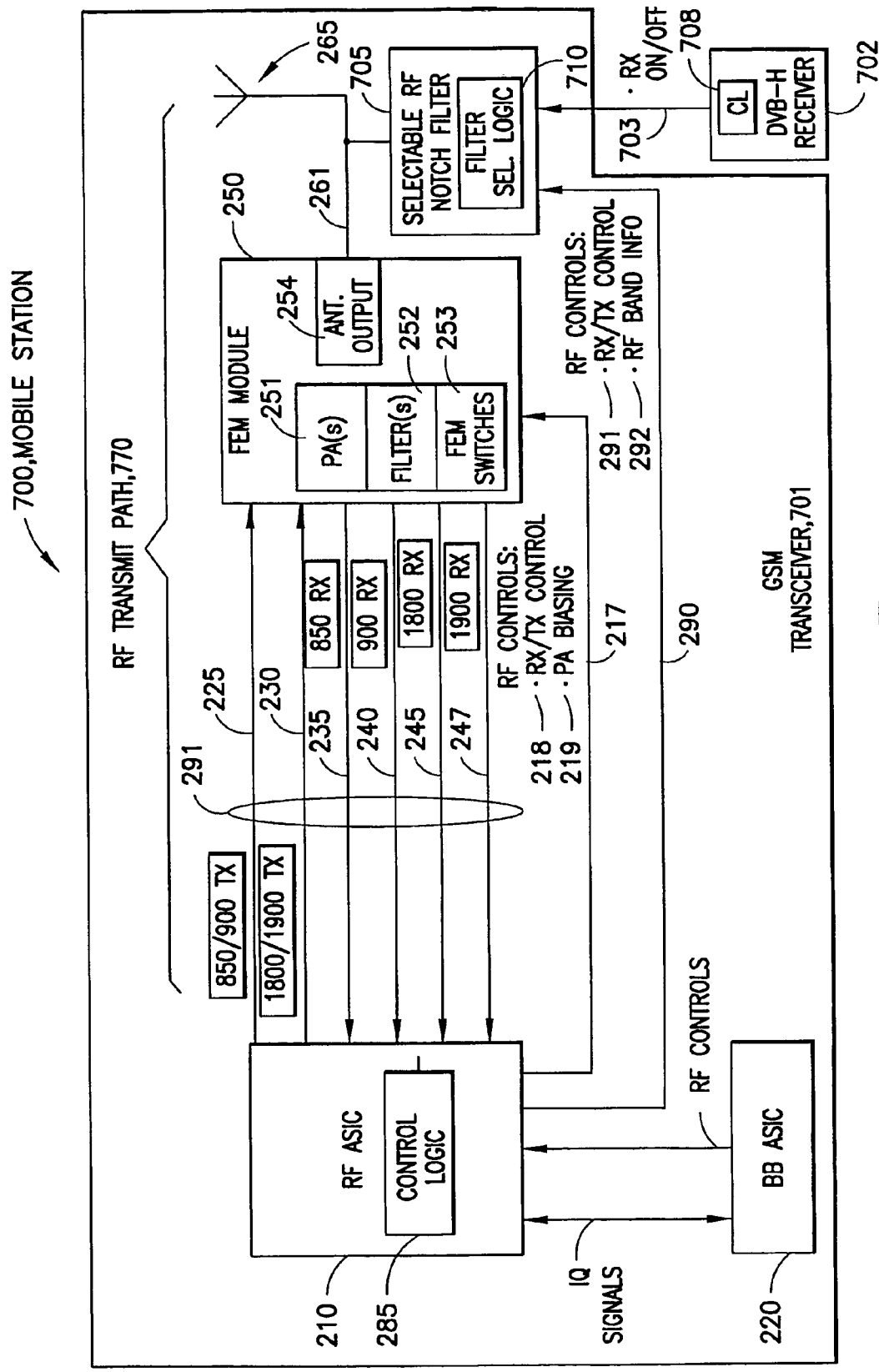
FIG. 7 is a block diagram of a mobile station in accordance with an exemplary embodiment of the present invention and is used to illustrate filtering of GSM transmission signals.

Turning now to FIG. 7, a mobile station 700 is shown in accordance with an exemplary embodiment of the present invention. Mobile station 700 contains many of the components shown in FIG. 2. In this example, however, the GSM transceiver 701 comprises a selectable RF notch filter 705 that also uses the RX on/off signal 703. The DVB-H receiver 702 comprises control logic 708 that generates the RX on/off signal 703. The RX on/off signal 701 is a signal indicating whether the DVB-H receiver 702 is or is not in a reception mode. The selectable RF notch filter 705 comprises filter selection logic 710 that uses the RF controls 291 and the RX on/off signal 703 to select and couple a filter (see FIGS. 3-6) to the antenna coupling 261 or to decouple the filter from the antenna coupling 261. The filter selection logic 710 is control logic for the selectable RF notch filter 705. The RX on/off signal 703 may be enabled by the DVB-H receiver 702 when the DVB-H receiver 702 is in a reception mode, or logic in the selectable RF notch filter 705 can query the DVB-H receiver 702 for the RX on/off signal 703.

In the filtering scheme of FIG. 7, whether the DVB-H receiver 702 is in a reception mode or not (e.g., as indicated by the RX on/off signal 703) is used also for filter selection. The DVB-H receiver 702 typically receives for a few hundred milliseconds and then the DVB-H receiver 702 is in idle mode for a few seconds. When the DVB-H receiver 702 is in an idle mode, extra filtering is not needed.

When the RX on/off signal 703 is also used for controlling filtering of frequency bands, then filtering is generally used only when the DVB-H receiver 702 is in a reception mode (e.g., actively receiving or possibly preparing to receive) and a GSM frequency band is being transmitted by the GSM transceiver 701 at the same time.

Figure 8:
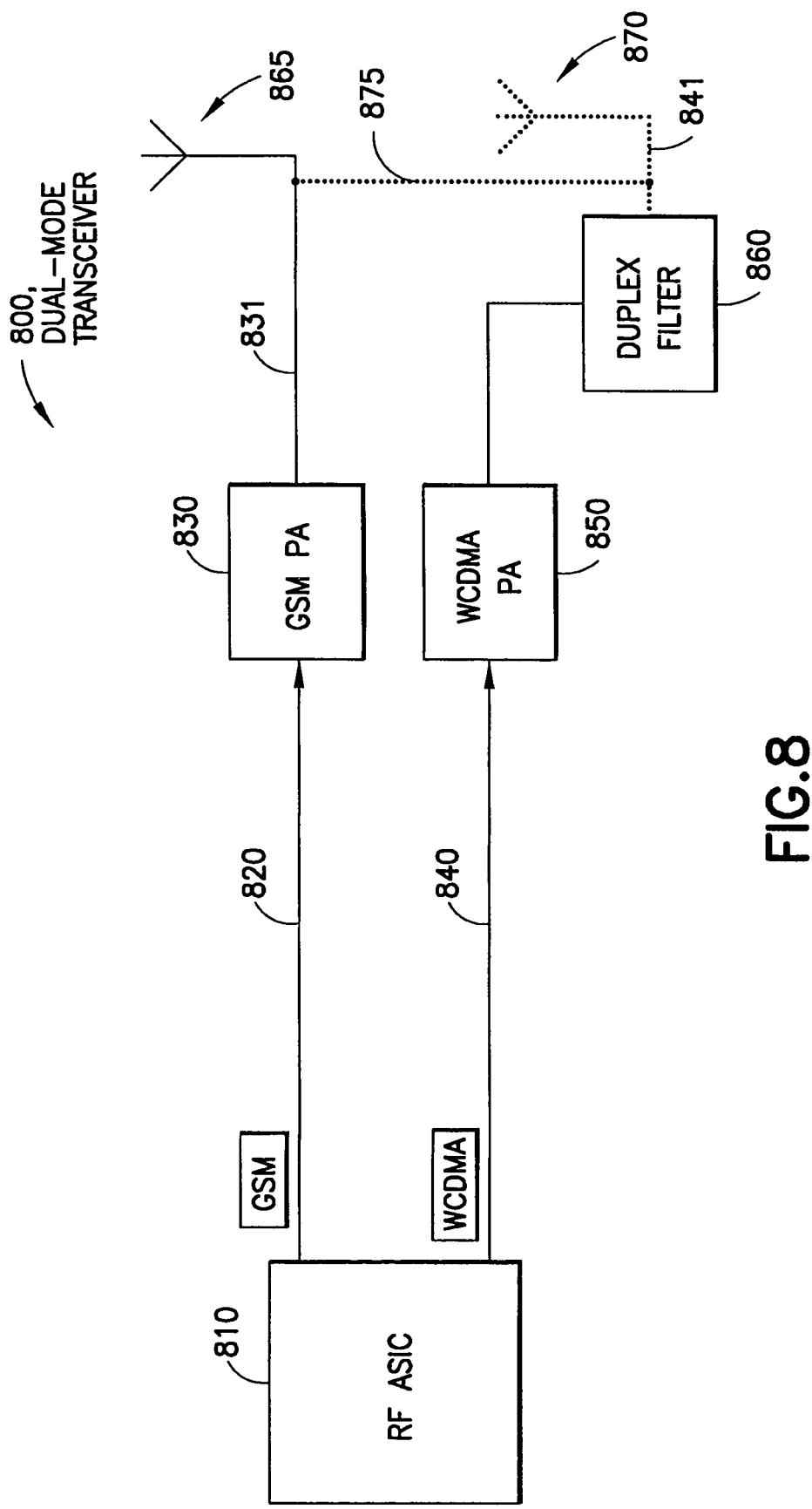
FIG. 8 is a block diagram of a transceiver for a dual-mode mobile station that supports GSM and code-division multiple-access (CDMA)

Alternative techniques for filtering U.S. DVB-H channel noise caused by GSM transmissions can be performed in dual-mode GSM and wide-band CDMA (WCDMA) mobile stations. A typical dual-mode transceiver 800, for use in a dual mode GSM/WCDMA mobile station, is shown in FIG. 8. Transceiver 800 comprises an RF ASIC 810, a GSM bus 820, a GSM PA 830, a WCDMA bus 840, a WCDMA PA 850, a duplex filter 860, antennas 865 and 870, and antenna couplings 831, 841, and 875. GSM signals are transmitted over the GSM bus 820, and WCDMA signals are transmitted over the WCDMA bus 840.

Future U.S. products will include WCDMA operation at both cellular frequency bands 850 and 1900, and at the both of these frequency bands GSM operation will also continue. These future U.S. products, an exemplary transceiver 800 of which is shown in FIG. 8, will be dual-band products with dual-mode operation.

Since WCDMA and GSM are operating at the same frequency, one common antenna (e.g., antenna 865, coupled to the duplex filter 860 using the antenna coupling 875) can be used or separate antennas (e.g., antenna 865 and antenna coupling 831 for GSM and antenna 870 and antenna coupling 841 for WCDMA) for both systems can be used. The dotted lines in FIG. 8 indicate optional arrangements.

FIG. 8 shows only WCDMA duplex filter 860, but in fact for each frequency band 850 and 1900, one duplex filter 860 is needed. Additionally, a duplex filter 860 typically contains two pass-band filters: one for reception and one for transmission.

Figure 9:
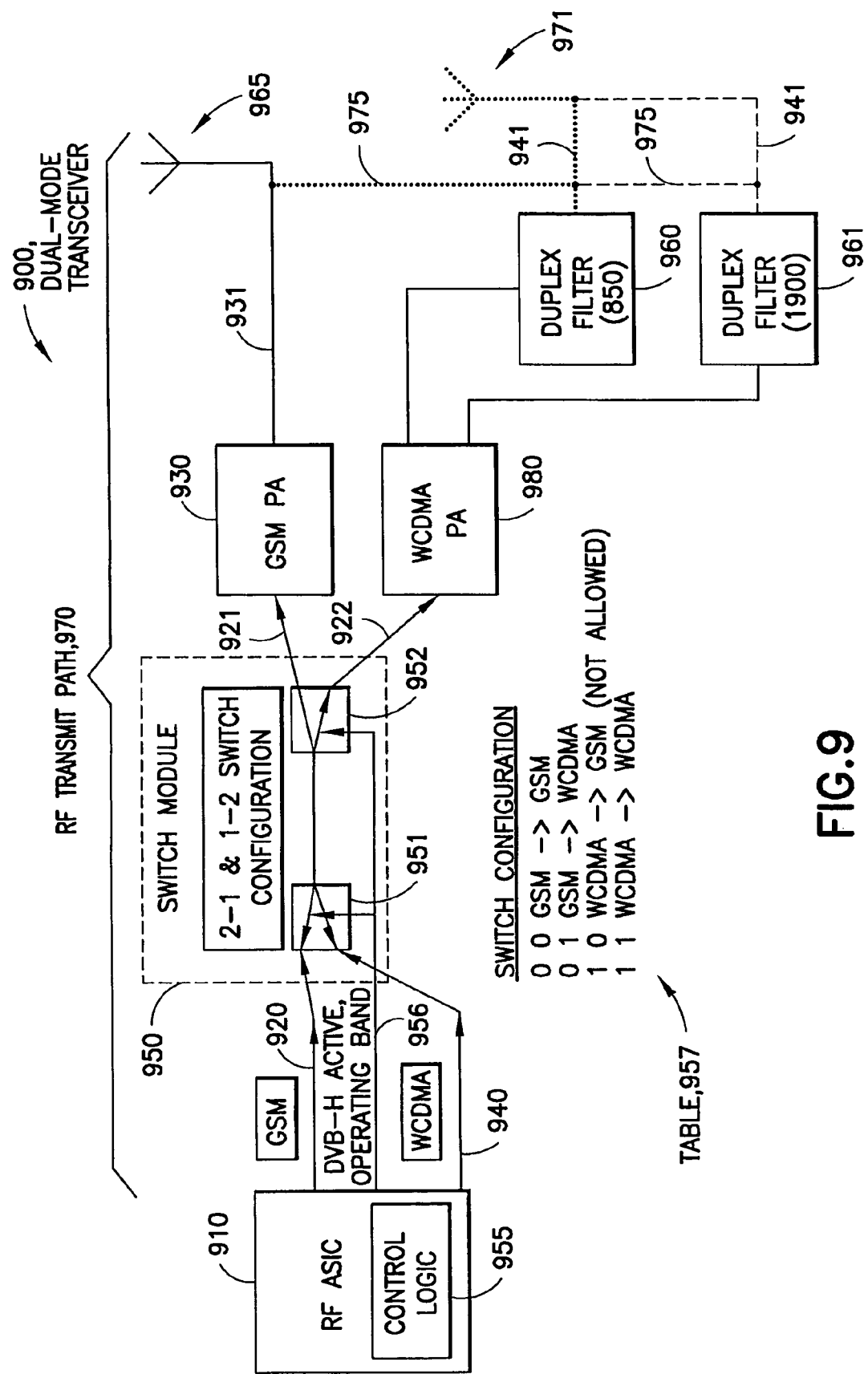
FIG. 9 is a block diagram of a transceiver for a dual-mode mobile station that supports GSM and CDMA, in accordance with an exemplary embodiment of the present invention.

Referring now to FIG. 9, this figure shows a dual-mode transceiver 900 operating in accordance with an exemplary embodiment of the present invention. Transceiver 900 comprises an RF ASIC 910, a GSM bus 920, a GSM PA 930, a WCDMA bus 940, a WCDMA PA 980, two duplex filters 960 and 961, a switch module 950, antennas 965 and 971, and antenna couplings 931, 941, and 975, and two switch outputs 921, 922. The RF ASIC 910 is an RF device that creates and communicates RF signals using one of several frequency bands. Note that the RF ASIC 910 may comprise multiple RF devices (e.g., one RF device could create and communicate RF signals defined by the GSM communication protocol, while another RF device creates and communicates RF signals defined by the WCDMA protocol). When a DVB-H receiver (not shown in FIG. 9) is not coupled to the dual-mode transceiver 900 or is not in a reception mode (e.g., receiving), signals defined by the GSM communication protocol are typically transmitted over the GSM bus 920 and the switch output 921, and signals defined by the WCDMA communication protocol are transmitted over the WCDMA bus 940 and the switch output 922.

As with FIG. 8, since the communication protocols of WCDMA and GSM are operating at the same frequency, one common antenna (e.g., antenna 965, coupled to the duplex filter 960 using the antenna coupling 975) can be used or separate antennas (e.g., antenna 965 and antenna coupling 931 for GSM and antenna 971 and antenna coupling 941 for WCDMA) for each communication protocol can be used. The dotted lines in FIG. 9 indicate optional arrangements for the antennas 965, 971 and antenna couplings 931, 941, and 975.

FIG. 9 shows that for each frequency band 850 and 1900, one duplex filter 960 (e.g., the frequency band 850) or 961 (e.g., the frequency band 1900) is typically used. Additionally, a duplex filter 960 or 961 typically contains two pass-band filters: one for reception and one for transmission.

In FIG. 9, the switch module 950 comprises two switches 951 and 952. The control logic 955 uses an input from the DVB-H receiver (not shown in FIG. 9) to determine the control signal 956, which in this example is two bits. The control signal 956 is also determined using the transmitting frequency bands for GSM. The control of the GSM routing to WCDMA transmitter is controlled with operating band information and when DVB-H is active.

The switch module 950 is responsive to states of the control signal 956 and will modify the RF transmit path 970 to couple the duplex filters 960, 961 to the RF transmit path 970 when certain conditions are met. The RF transmit path 970 is modified so that the duplex filters 960, 961 are coupled to the RF transmit path 970 by coupling the GSM bus 920 to the switch output 922, so that the WCDMA PA 980 and the duplex filters 960, 961 (e.g., and possibly the antenna 971) become part of the RF transmit path 970. In the example of FIG. 9 and as shown in table 957, the GSM bus 920 is coupled to the WCDMA PA 980 when the control signal 956 has a state where two bits are a zero and a one. For other versions of the control signal 956, the RF transmit path 970 is modified by the switch module 950 to decouple the duplex filter 960 from the RF transmit path 970 for GSM signals from the RF ASIC 910. For instance, the GSM bus 920 remains coupled to the GSM PA 930 when the control signal 956 has a state where two bits are both zeros. The WCDMA bus 940 remains coupled to the WCDMA PA 980 when the control signal 956 has a state where two bits are both ones. The state of having a first bit being a one and a second bit being a zero for the control signal 956 is not allowed in this example. It should be noted in FIG. 9 that there is only one RF transmit path 970, as both WCDMA and GSM signals will not be transmitted at the same time.

In WCDMA mode (e.g., both bits of the control signal 956 are ones in the example of FIG. 9), the transmission is filtered after the WCDMA PA 980 with a duplex filter 960. Transmission filters (not shown) in the duplex filters 960, 961 will attenuate transmission harmonics and wide band noise. For at least this reason, a GSM transmission can be filtered by the duplex filters 960, 961.

The duplex filters 960, 961 will increase loss after the WCDMA PA 980 and thus lower transmitted output power is delivered to antenna 965 (e.g., or 971). For this reason, it is beneficial that the GSM transmission is filtered only when DVB-H receiver is in a reception state. In FIG. 9, "GSM" means both the 850 and 1900 frequency bands for the GSM communication protocol and "WCDMA" means both the 850 and 1900 frequency bands for the WCDMA communication protocol. Additionally, in FIG. 9, the GSM PA 930 includes both GSM frequency band 850 and 1900 amplifiers and the WCDMA PA 980 includes both WCDMA frequency band 850 and frequency band 1900 amplifiers.

FIGS. 2-7 and 9 have shown examples of how interoperability between receivers and transmitters can be improved in a mobile station. FIGS. 2-7 and 9 use filtering, among other things, to improve interoperability.

Figure 10:
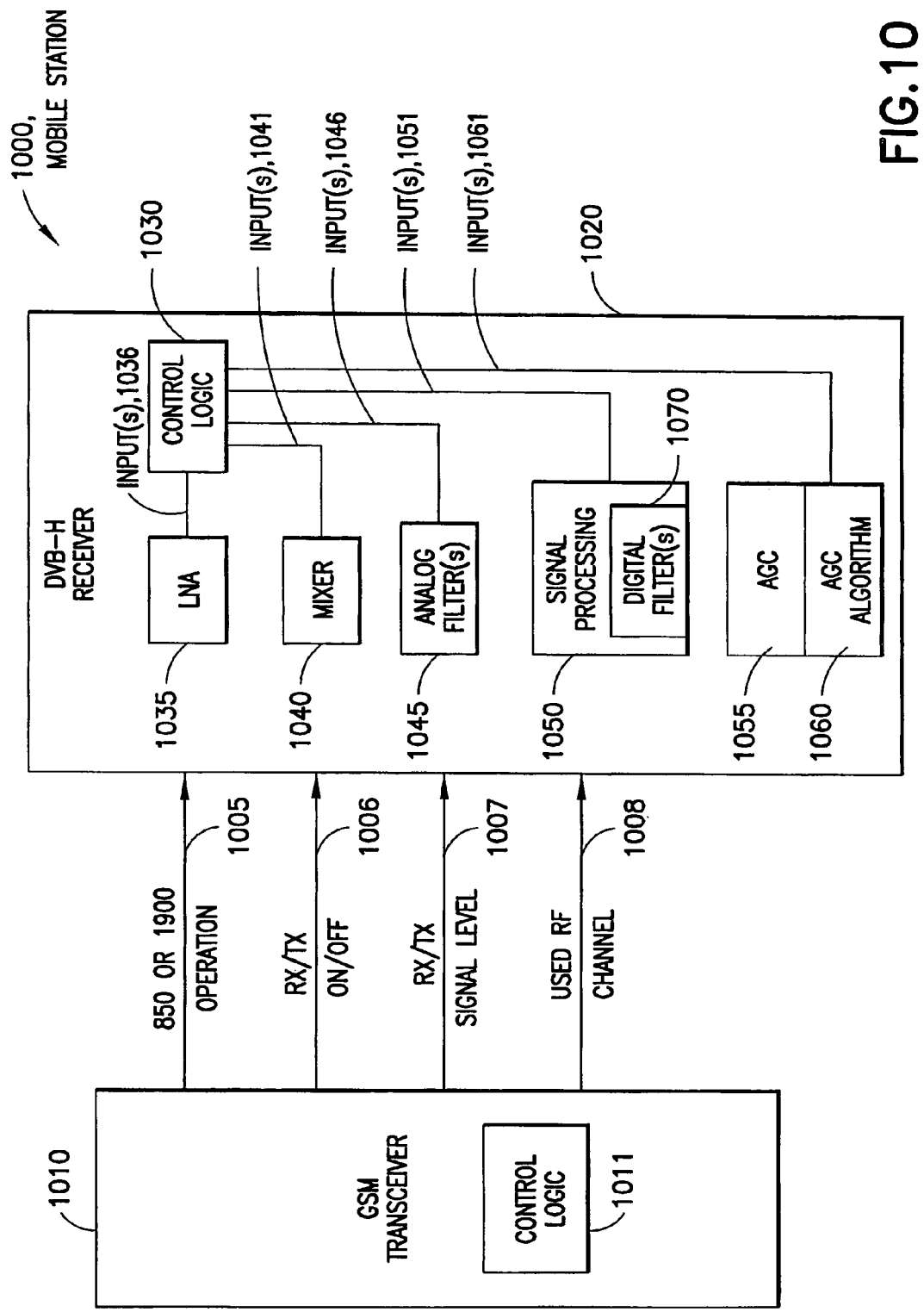
FIG. 10 is a block diagram of a mobile station that improves operability between a GSM transceiver and a DVB-H receiver.
Figure 11:
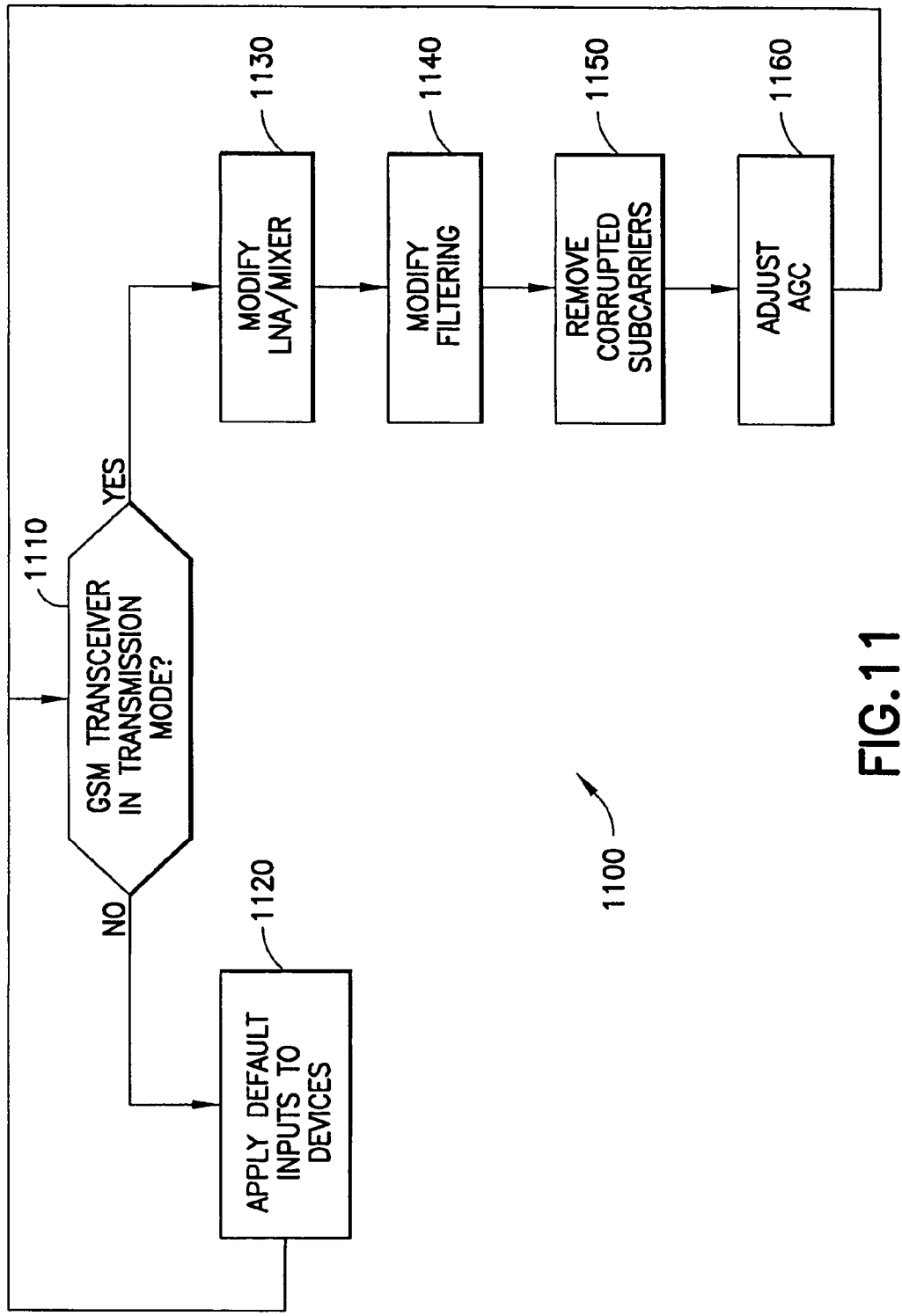
FIG. 11 is a flow chart for improving interoperability between GSM transceivers and DVB-H receivers.

FIGS. 10 and 11 illustrate other exemplary techniques for improving interoperability between receivers and transmitters in a mobile station. In particular, in response to a transmission (e.g., which can include preparations to transmit) the DVB-H receiver is adjusted, preferably by modifying inputs used by devices in the DVB-H receiver.

Turning now to FIG. 10, a mobile station 1000 is shown. Mobile station 1000 comprises a GSM transceiver 1010 coupled to a DVB-H receiver 1020. DVB-H receiver 1020 comprises control logic 1030, an LNA 1035, a mixer 1040, one or more filters 1045, a signal processing module 1050, and an AGC module 1055. The AGC module 1055 comprises an AGC algorithm 1061. The signal processing module 1050 comprises one or more digital filters 1070. The control logic 1030 controls operations of the DVB-H receiver 1020, such as controlling the LNA 1035, mixer 1040, filters 1045, signal processing module 1050, and AGC module 1055 to receive information in the DVB-H frequency band of the DVB-H RF signal 1090. Certain signals are coupled between the GSM transceiver 1010 and the DVB-H receiver 1020. The control logic 1011 of the GSM transceiver 1010 generates these signals. In the example of FIG. 10, the following signals are coupled between the GSM transceiver 1010 and the DVB-H receiver 1020: 850 or 1900 operation 1005; RX/TX on/off 1006; RX/TX signal level 1007; and used RF channel 1008. Note that not all of these signals need to be used and additional signals may be provided, if desired. The control logic is responsive to the signals 1005-1008 and modifies one or more of the value(s) 1036, 1041, 1051, and 1061 in response to one or more of the signals 1005-1008.

The channel numbers of different GSM systems are shown in table below:

| GSM system | Lowest channel number | Highest channel number |
|---|---|---|
| GSM850 | 128 | 251 |
| GSM900 | 975 | 124 |
| GSM1800 | 512 | 885 |
| GSM1900 | 512 | 810 |

From this table, it can be seen that the same channel numbers are used in different GSM systems. Thus operational band information is needed for controlling purposes.

The signal 1007 information can be used for the optimization purposes. When transmission signal levels are known, then the DVB-H receiver can be linearized only to a needed level. This is desirable since a more linear mode consumes more power.

Additionally, some or all of the functionality (e.g., including the devices 1035, 1040, 1045, 1050, and 1055) of the DVB-H receiver 1010 may be performed by processors such as a digital signal processor (DSP), hardware such as very large scale integrated circuits (VLSI), or programmable logic devices (e.g., using read only memories) such as field programmable gate arrays (FPLGA), or some combination of these or any other suitable device. The signals herein may be, for instance, signals that travel on conductive elements, such as traces or wires, or may be one or more messages that are passed between software modules.

Referring now to FIG. 11, with appropriate reference to FIG. 10, a method 1100 is shown for improving interoperability between the GSM transceiver 1010 and the DVB-H receiver 1020 in the mobile station 1000. Method 1100 is typically performed by the control logic 1030.

In step 1110, it is determined if the GSM transceiver 1010 is in transmission mode (e.g., or is not in a reception mode). Adjustment is not needed when the GSM transceiver 1010 is in reception mode (step 1110=No), and default inputs are applied to the devices 1035, 1040, 1045, 1050, and 1060 by using inputs 1041, 1046, 1051, and 1061. Note that the GSM transceiver 1010 may also have an idle mode, and default inputs would also be applied to the devices when the GSM transceiver 1010 is in idle mode.

If the GSM transceiver 110 is operating in transmission mode (step 1110=Yes), then the method continues in step 1130. Note that one or all of steps 1130 through 1160 may be performed.

In step 1103, the LNA 1035 and mixer 1040 are adjusted using inputs 1036 and 1041, respectively. It should be noted that the LNA 1035 and the mixer 1040 may be separately adjusted, if desired. The inputs for the LNA 1035 and mixer 1040 are modified for more linear mode with higher noise figure when harmonics are transmitted in order to avoid compression. This way, the DVB-H receiver 1020 can better tolerate interference signals.

Increasing the biasing current (e.g., as input 1036) of the LNA 1035 can force the LNA 1035 to a more linear mode. The same applies also for mixer 1040 (e.g., increasing the biasing current as input 1041 to the mixer 1040 can force the mixer 1040 to a more linear mode). In normal operation mode (step 1120), the LNA 1035 and mixer 1040 are biased (e.g., using inputs 1036 and 1041) to a low biasing mode in order to achieve a long operating time for the mobile station 1000. The high biasing mode (step 1130) is typically only used when high interference signal of a GSM transmission is present. This high biasing mode consumes more power and thus reduces operating time of the mobile station 1000.

Note that step 1130 will typically change to high biasing mode when the GSM transceiver 1010 is transmitting on either of the 850 or 1900 frequency bands (e.g., as indicated by the RX/TX On/off signal 1006).

In step 1140, DVB-H RF filtering, as performed by filter(s) 1045, is modified based on GSM transmission frequency information. The GSM transmission frequency information can be determined using the signal used RF channel 1008, which indicates whether the 850 or 1900 frequency band was used, and the 850 or 1900 operation signal 1005, which indicates whether one of the frequency bands 850 or 1900 is being used to transmit. Step 1140 is typically used when GSM harmonics will fall near the frequency band used by the DVB-H RF signal 1090 but the actual harmonic is outside of the frequency band used by the DVB-H RF signal 1090 (e.g., an out-of-band blocker). Step 1140 is used, for instance, for the 1900 frequency band, which generates harmonics outside of the frequency band used by the DVB-H RF signal 1090.

The filtering can be changed at the base band filtering (performed, e.g., by filters 1045) and in filtering performed by the signal processing module 1050. Typically, the signal processing module 1050 is implemented at least partially by a DSP. The base band filtering can be modified by reducing the signal bandwidth. The actual modification is the modification of a corner frequency of a low pass filter 1045 or modification of an order of the filter 1045 or both. These modifications may be performed through inputs 1046, which are typically values associated with the filter 1045. The modification of order may improve performance of the DVB-H receiver 1020 when the signal interference caused by the GSM transmission is near the DVB-H frequency band. Analog domain filtering is done to protect an analog-to-digital converter (not shown) in the DVB-H receiver 1020 from not saturating due to strong interference signals.

The filtering (e.g., digital filter 1070) performed by the signal processing module 1050 can be changed by altering the filtering coefficient (e.g., an input 1051) of a finite impulse response (FIR) filter implemented by the signal processing module 1050. Filtering performed by the signal processing module 1050 may also be used to filter sub-carriers of the DVB-H RF signal 1090 (see step 1150 below). The filtering performed by the signal processing module 1050 also corrects non-idealities caused by analog filtering. The non-idealities comprise amplitude and phase corrections.

In step 1150, corrupted sub-carriers are removed. The DVB-H signal is an orthogonal frequency division multiplexed (OFDM) signal which includes a number of sub-carriers (in 2 k mode 1705, 4 k mode 3409 and 8 k mode 6817 sub-carriers). When GSM channel number (e.g., through used RF channel signal 1008) is submitted to the DVB-H receiver 1020, the signal processing module 1050 (e.g., implemented using a DSP) can remove corrupted sub-carriers, because GSM harmonics will completely destroy only selected sub-carriers. Step 1150 is typically performed when transmission in a GSM frequency band, such as the 850 frequency band, generates harmonics inside of the frequency band used by the DVB-H RF signal 1090 (e.g., co-channel interference or spurious interference).

The corrupted sub-carriers can be removed by ignoring the sub-carrier information. This is the easiest technique to implement removal of sub-carriers. An alternative technique is to ignore sub-carrier information from sub-carriers that are expected to be corrupted and to use previous information (e.g., stored information) from these sub-carriers. This stored information is added to new information from other carriers and this mixed combined signal is filtered and further processed.

In step 1150, the control logic 1030 modifies an input 1151 to the signal processing module 1050, and the signal processing module 1050 is responsive to the modified input 1151 to filter corrupted sub-carriers. For instance, the input 1151 could be a default message (e.g., "perform normal processing") when the used RF channel signal 1008 indicates that the 850 frequency band is not being used for transmission, and the input 1151 could be a different message (e.g., "remove sub-carriers") when the used RF channel signal 1008 indicates that the 850 frequency band is being used for transmission.

The impact of the sub-carrier removal is that raw bit-error rate will increase but if the bit-per-symbol interleaving is done over several sub-carriers and over multiple symbol times, then this sub-carrier information removal may be corrected. The correction is based on signal interleaving and information coding. The actual performance reduction, which can be seen by sub-carrier removal, is a function of the performance of interleaving and coding and the signal bandwidth of DVB-H RF signal 1090.

In step 1160, the AGC module 1055 can be altered, using inputs 1061 and typically the AGC algorithm 1060, when harmonics are present, such as when the 850 frequency band is being used to transmit. In this manner, the recovery time from the high power spurious signals can be improved. For instance, an AGC value which determines actual amplification of the variable gain amplifier (not shown) before spurious signals are present (e.g., as determined by the 850 or 1900 operation signal 1005 and the used RF channel signal 1008) can be used until after the spurious signals disappear. For instance, the control logic 1030 could cause an input 1061 to be modified that in turn causes the AGC algorithm 1060 to "freeze" its value until the input 1061 is again modified. Another possibility is that AGC bandwidth can be altered (e.g., such as by modifying values using inputs 1061 of a filter used by the AGC 1055) when narrow-bandwidth spurious signals are expected to appear.

Figure 12:
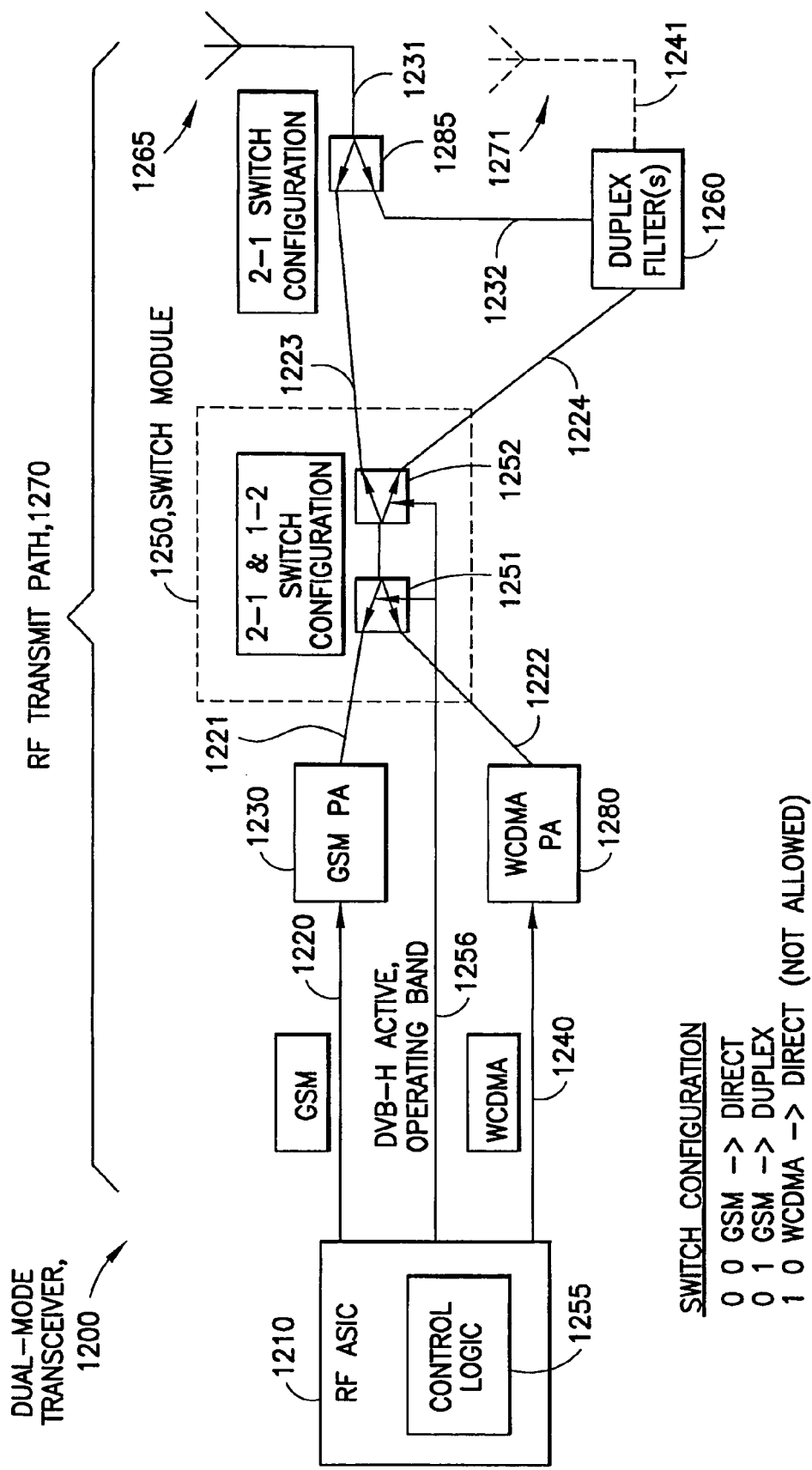
FIG. 12 is a block diagram of a transceiver for a dual-mode mobile station that supports GSM and CDMA, in accordance with an exemplary embodiment of the present invention.

Referring now to FIG. 12, this figure shows a dual-mode transceiver 1200 operating in accordance with an exemplary embodiment of the present invention. Transceiver 1200 comprises an RF ASIC 1210, a GSM bus 1220, a GSM PA 1230, a WCDMA bus 1240, a WCDMA PA 1280, duplex filter(s) 1260, a switch module 1250, antennas 1265 and 1271, antenna couplings 1231 and 1241, switch inputs 1221 and 1222, switch couplings 1223 and 1224, a control signal 1256, a switch 1285, and duplexer coupling 1232. The switch module 1250 comprises switches 1251, 1252. Switch module 1250 (e.g., switches 1251, 1252) and 1285 are responsive to the control signal 1256. The RF ASIC 1210 comprises control logic 1255. The RF ASIC 1210 is an RF device that creates and communicates RF signals using one of several frequency bands. Note that the RF ASIC 1210 may comprise multiple RF devices (e.g., one RF device could create and communicate RF signals defined by the GSM communication protocol, while another RF device creates and communicates RF signals defined by the WCDMA protocol). When a DVB-H receiver (not shown in FIG. 12) is not coupled to the dual-mode transceiver 1200 or is not in a reception mode (e.g., receiving), signals defined by the GSM communication protocol are typically transmitted over the GSM bus 1220, through GSM PA 1230 and the switch input 1221, through the switches 1251 and 1252, through the switch coupling 1223, through the switch 1285 and antenna coupling 1231, and to the antenna 1265. Similarly, signals defined by the WCDMA communication protocol are transmitted over the WCDMA bus 1240, through the WCDMA PA 1280 and the switch input 1222, through the switches 1251 and 1252, through the switch coupling 1224 and duplex filter(s) 1260, and through the duplexer coupling 1232 and the switch 1285 to the antenna coupling 1231 and the antenna 1265.

Since the communication protocols of WCDMA and GSM are operating at about the same frequency, one common antenna (e.g., antenna 1265, coupled to the switch 1285 using the antenna coupling 1231) can be used or separate antennas (e.g., antenna 1265 and antenna coupling 1231 for GSM and antenna 1271 and antenna coupling 1241 for WCDMA) for each communication protocol can be used. For instance, in the WCDMA Third Generation Partnership Project (3GPP) Standard 25.101, version 6.7.0 (March 2005), the following UMTS Terrestrial Radio Access (UTRA) Frequency Division Duplex (FDD), where UMTS stands for "Universal Mobile Telecommunications System," the following frequency bands can be used for WCDMA:

| Operating Band | Uplink Frequencies | Downlink Frequencies |
| --- | --- | --- |
| I | 1920-1980 MHz | 2110-2170 MHz |
| II | 1850-1910 MHz | 1930-1990 MHz |
| III | 1710-1785 MHz | 1805-1880 MHz |
| IV | 1710-1755 MHz | 2110-2155 MHz |
| V | 824-849 MHz | 869-894 MHz |
| VI | 830-840 MHz | 875-885 MHz |

Figure 13:
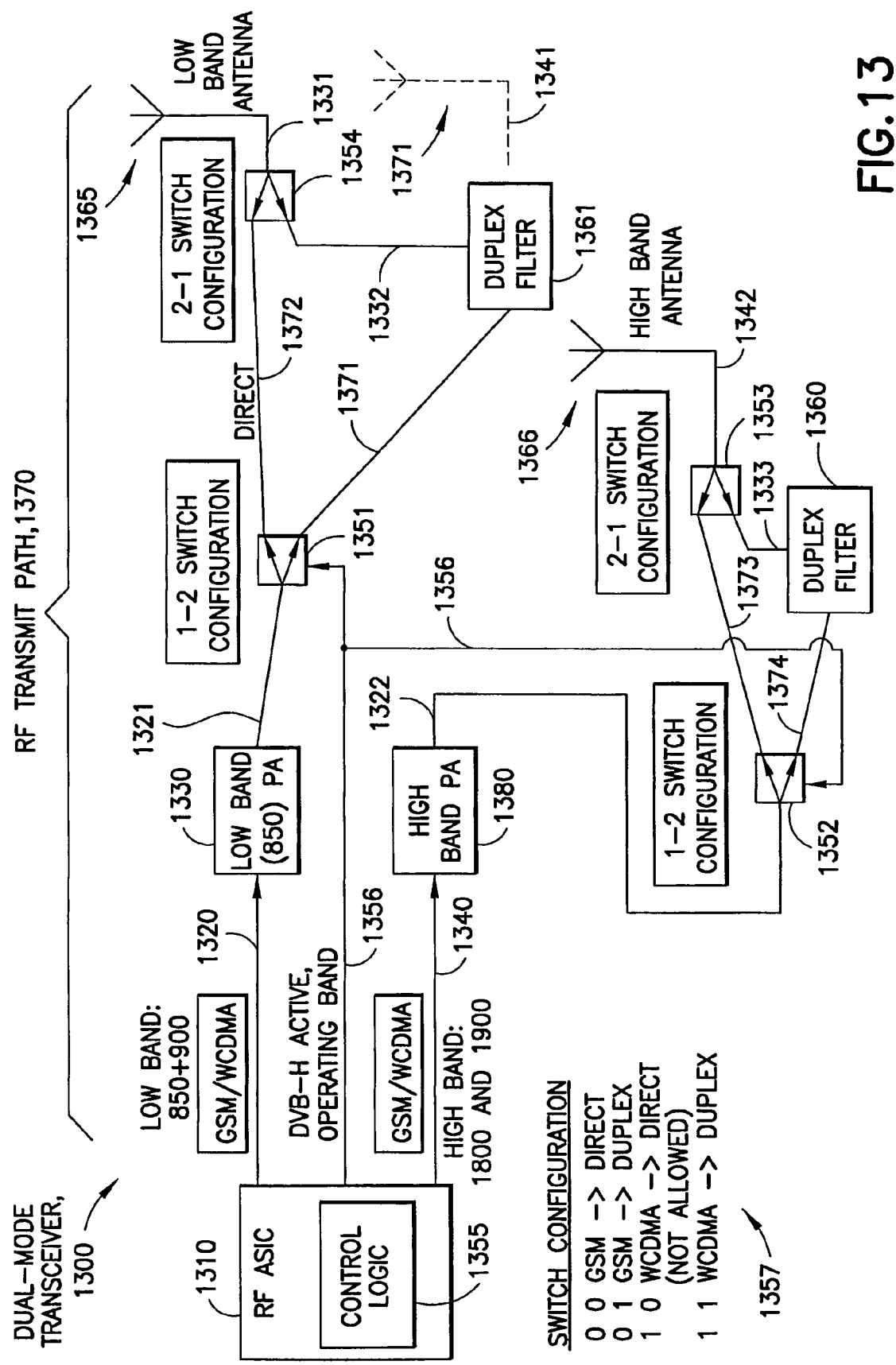
FIG. 13 is a block diagram of a transceiver for a dual-mode mobile station that supports GSM and CDMA, in accordance with an exemplary embodiment of the present invention.

Thus, the WCDMA Operating Band II above, may be used in FIGS. 12 and 13 (e.g., and in other figures above), as can other operating bands such as Operating Bands I and III-VI. In the examples given above, the Operating Bands I and II could be considered the "WCDMA1900" frequency band, the Operating Bands III and IV could be considered the "WCDMA1800" frequency band, the Operating Band V could be considered the "WCDMA850" frequency band, and the Operating Band VI could be considered the "WCDMA900" frequency band. The dotted lines in FIG. 12 indicate optional arrangements for the antennas 1265, 1271 and antenna couplings 1231, 1241. The duplex filter(s) 1260 has typically (e.g., as described in reference to FIG. 9 above and also to FIG. 13 below) two duplex filters, one for low and high frequency bands (e.g., 850 and 1900). Additionally, a duplex filter(s) 1260 typically contains two pass-band filters: one for reception and one for transmission.

In FIG. 12, the control logic 1255 uses an input from the DVB-H receiver (not shown in FIG. 12) to determine the control signal 1256, which in this example is two bits. The control signal 1256 is also determined using the transmitting frequency bands for GSM. The control of the GSM routing to WCDMA transmitter (e.g., duplex filter(s) 1260) is determined using GSM operating band information and DVB-H activity (e.g., reception is occurring on a DVB-H frequency band). In the case of U.S. operating frequency bands, both the low frequency band (e.g., GSM850) and high frequency band (e.g., GSM1900) for GSM will be routed to an appropriate one of the duplex filter(s) 1260. For instance, the high frequency band (e.g., GSM1900) would be routed to a filter in the duplex filter(s) 1260 suitable for filtering the high frequency band.

The switch module 1250 and the switch 1285 are responsive to states of the control signal 1256 and will modify the RF transmit path 1270 to couple the duplex filter(s) 1260 to the RF transmit path 1270 when certain conditions are met. The RF transmit path 1270 is any path through which RF signals may be routed for transmission. For instance, when the RF ASIC 1210 is transmitting using the GSM 850 frequency band and the DVB-H receiver is not receiving, the RF transmit path 1270 comprises the GSM bus 1220, the GSM PA 1230, the switch input 1221, the switch module 1250, the switch coupling 1223, the switch 1285, the antenna coupling 1231 and the antenna 1265. The RF transmit path 1270 is modified so that the duplex filter(s) 1260 are coupled to the RF transmit path 1270 by coupling the GSM bus 1220 to the switch coupling 1224, so that the duplex filter(s) 1260 becomes part of the RF transmit path 1270 to the antenna 1265 or to the antenna 1271. Note that if antenna 1271 is used, the switch 1285 need not be necessary.

In the example of FIG. 12 and as shown in table 1257, the GSM bus 1220 is coupled to the duplex filter(s) 1260 when the control signal 1256 has a state where two bits are a zero and a one. For other versions of the control signal 1256, the RF transmit path 1270 is modified by the switch module 1250 and the switch 1285 to decouple the duplex filter 1260 from the RF transmit path 1270 for GSM signals from the RF ASIC 1210. For instance, the GSM bus 1220 is coupled through a first path having the switch coupling 1223 and the antenna coupling 1231 when the control signal 1256 has a state where two bits are both zeros. The WCDMA bus 1240 is coupled through a second path having the duplex filter(s) 1260 and the antenna coupling 1231 when the control signal 1256 has a state where two bits are both ones. The state of having a first bit being a one and a second bit being a zero for the control signal 1256 is not allowed in this example. It should be noted in FIG. 12 that there is only one RF transmit path 1270, as both WCDMA and GSM signals will typically not be transmitted at the same time.

In WCDMA mode (e.g., both bits of the control signal 1256 are ones in the example of FIG. 12), the transmission is filtered after the WCDMA PA 1280 with a duplex filter(s) 1260. Transmission filters (not shown) in the duplex filter(s) 1260 will attenuate transmission harmonics and wide band noise. For at least this reason, a GSM transmission can be filtered by the duplex filter(s) 1260.

The duplex filter(s) 1260, however, will typically increase loss after the GSM PA 1230 and thus lower transmitted output power is delivered to antenna 1265 (e.g., or 1271). For this reason, it is beneficial that the GSM transmission is filtered only when the DVB-H receiver is in a reception state. In FIG. 12, "GSM" means, e.g. for the U.S., both the 850 and 1900 frequency bands for the GSM communication protocol and "WCDMA" means one or more of the Operating Bands in the table shown above for the WCDMA communication protocol. Note that E.U. frequency bands may also be used. Additionally, in FIG. 12, the GSM PA 1230 includes both GSM frequency band 850 and 1900 amplifiers and the WCDMA PA 1280 includes both WCDMA low (e.g., Operating Band V and VI) and high (e.g., Operating Band I-IV) frequency band power amplifiers. It should be noted that the switch 1252 could have three outputs, a first output for switch coupling 1223, a second output for a coupling to a duplex filter 1260 for the a low frequency band, and a third output for a high frequency band. In this example, there would be three possible paths through which the RF transmit path 1270 may be routed after the switch 1252.

Referring now to FIG. 13, this figure shows a dual-mode transceiver 1300 operating in accordance with an exemplary embodiment of the present invention. Transceiver 1300 comprises an RF ASIC 1310, a low band bus 1320, a low band PA 1330, a high band bus 1340, a high band PA 1380, duplex filters 1360, 1361, switches 1351-1354, antennas 1365, 1366, and 1371, antenna couplings 1331, 1341, and 1342, switch couplings 1321, 1322, and 1371-1374, a control signal 1356, and duplexer couplings 1332, 1333. Switches 1351-1354 are responsive to the control signal 1356. The RF ASIC 1310 comprises control logic 1355. The RF ASIC 1310 is an RF device that creates and communicates RF signals using one of several frequency bands. Note that the RF ASIC 1310 may comprise multiple RF devices. The low band bus 1320 carries either the lower GSM frequency band (e.g., GSM850) or the lower WCDMA frequency band (e.g., Operating Band V or VI, the latter shown as "900" in FIG. 13), while the high band bus 1340 carries either the higher GSM frequency band (e.g., GSM1900) or the higher WCDMA frequency band (e.g., Operating Band I-IV).

When a DVB-H receiver (not shown in FIG. 13) is not coupled to the dual-mode transceiver 1300 or is not in a reception mode (e.g., receiving), signals defined by the GSM communication protocol and in a low frequency band are typically transmitted over the low band bus 1320, through low band PA 1330 and the switch coupling 1321, through the switch 1351 and the switch coupling 1372, through the switch 1354, through the antenna coupling 1331, and to the antenna 1365. Additionally, signals defined by the WCDMA communication protocol and in the low frequency band are typically transmitted over the low band bus 1320, through low band PA 1330 and the switch coupling 1321, through the switch 1351 and the switch coupling 1371, through the duplex filter 1361, through the duplexer coupling 1332 and switch 1354 and to the antenna coupling 1331 and antenna 1365. Additionally, the antenna coupling 1341 and the antenna 1371 could be used instead of the duplexer coupling 1332, the switch 1354, and the antenna 1365.

Also when the DVB-H receiver is not coupled to the dual-mode transceiver 1300 or is not in a reception mode, signals defined by the GSM communication protocol and in a high frequency band are typically transmitted over the high band bus 1340, through high band PA 1380 and the switch coupling 1322, through the switch 1352 and the switch coupling 1373, through the switch 1353, through the antenna coupling 1342, and to the antenna 1366. Additionally, signals defined by the WCDMA communication protocol and in the high frequency band are typically transmitted over the high band bus 1340, through high band PA 1380 and the switch coupling 1322, through the switch 1352 and the switch coupling 1374, through the duplex filter 1360, through the duplexer coupling 1333 and switch 1353 and to the antenna coupling 1342 and antenna 1366. Each of the duplex filters 1360 and 1361 typically contains two pass-band filters: one for reception and one for transmission.

In FIG. 13, the control logic 1355 uses an input from the DVB-H receiver to determine the control signal 1356, which in this example is two bits. The control signal 1356 is also determined using the transmitting frequency bands for GSM. The control of the GSM routing to WCDMA transmitter (e.g., duplex filter(s) 1360) uses GSM operating band information and DVB-H activity (e.g., reception is occurring on a DVB-H frequency band).

The switches 1351-1354 are responsive to states of the control signal 1356 and will modify the RF transmit path 1370 to couple the duplex filters 1360, 1361 to the RF transmit path 1370 when certain conditions are met. The RF transmit path 1370 is any path through which RF signals may be routed for transmission. For instance, when the RF ASIC 1310 is transmitting using the GSM 850 frequency band and the DVB-H receiver is not receiving, the RF transmit path 1370 comprises the low band bus 1320, the low band PA 1330, the switch coupling 1321, the switch 1351, a first path having the switch coupling 1372 and the switch 1354, the antenna coupling 1331 and the antenna 1365. As another example, when the RF ASIC 1310 is transmitting using the GSM 1900 frequency band and the DVB-H receiver is not receiving, the RF transmit path 1370 comprises the high band bus 1340, the high band PA 1330, the switch coupling 1322, the switch 1352, a first path having the switch coupling 1373 and the switch 1353, the antenna coupling 1342 and the antenna 1366. In an exemplary embodiment, the RF transmit path 1370 is modified so that a second path having the duplex filter 1361 is coupled to the RF transmit path 1370 by coupling the low band bus 1320 to the switch coupling 1371 (e.g., as part of the second path), so that the duplex filter 1361 becomes part of the RF transmit path 1370 to the antenna 1365. Note that if antenna 1371 is used, the switch 1354 and duplexer coupling 1332 need not be necessary. In another exemplary embodiment, the RF transmit path 1370 is modified so that a second path having the duplex filter 1360 is coupled to the RF transmit path 1370 by coupling the high band bus 1340 to the switch coupling 1374 (e.g., as part of the second path), so that the duplex filter 1360 becomes part of the RF transmit path 1370 to the antenna 1366.

In the example of FIG. 13 and as shown in table 1357, the low band bus 1320 is coupled to the duplex filter 1361 and the high band bus 1340 is coupled to the duplex filter 1360 when the control signal 1356 has a state where two bits are a zero and a one. For other versions of the control signal 1356, the RF transmit path 1370 is modified by the switches 1351-1354 to decouple the duplex filters 1360 and 1361 from the RF transmit path 1370 for GSM signals from the RF ASIC 1310. For instance, GSM signals on the low band bus 1320 are coupled through the switch coupling 1372 to the antenna coupling 1331 and GSM signals on the high band bus 1340 are coupled through switch coupling 1373 to the antenna coupling 1342 when the control signal 1356 has a state where two bits are both zeros. WCDMA signals on the low band bus 1320 are coupled through the duplex filter 1361 to the antenna coupling 1331 and WCDMA signals on the high band bus 1340 are coupled through the duplex filter 1360 to the antenna coupling when the control signal 1356 has a state where two bits are both ones. The state of having a first bit being a one and a second bit being a zero for the control signal 1356 is not allowed in this example.

It should be noted in FIG. 13 that there is only one RF transmit path 1370, as both WCDMA and GSM signals will not be transmitted at the same time. Additionally, typically only one low or high frequency band for a communication protocol will be transmitted at one time. For instance, the low (850) GSM frequency band would be used for transmission and the high (1900) GSM frequency band would not be used for transmission. In the unlikely event that two frequency bands from the same (e.g., or different) communication protocol would be transmitted at the same time, then there could be two RF transmit paths: one from the low band bus 1320 to the antenna 1365 (e.g., or antenna 1371) and one from the high band bus 1340 to the antenna 1366.

Exemplary embodiments of the present invention have been described thus far in terms of specific examples of frequency bands and the like. However, it should be kept in mind that these teachings can be applied to other frequency bands, such as the frequency bands of 470-702 MHz that are allocated in the E.U. for DVB-H broadcasts, and to other the cellular transmission bands such as those produced by TDMA and/or CDMA cellular systems.

Also, while the above disclosure of the presently preferred embodiments has concentrated on the use of the DVB-H and GSM systems, those skilled in the art should realize that these should not be read as limitations on the practice of this invention, and that other types of communications systems using the same or different frequency bands may also benefit from the use of this invention.

It should be noted that embodiments of the present invention might be implemented on a signal bearing medium comprising a program of machine-readable instructions. The machine-readable instructions are executable by an apparatus to perform operations of one or more steps involved with the present invention.

Furthermore, filtering of a GSM signal is shown occurring at the antenna coupling 261, but other locations are possible. For instance, filtering could occur before the PA 251 of FIGS. 2 and 7, although filtering before the PA 251 may be less beneficial than filtering after the PA 251.

Additionally, the techniques presented above may be used for other frequency bands, such as the frequency bands specified by the CDMAOne and CDMA2000 standards. Broadly, any frequency band that can cause problems with DVB-H frequency bands may be filtered (e.g., FIGS. 2-10), inputs of devices in a DVB-H receiver modified (e.g., FIGS. 10 and 11), or both.

It is noted that there has recently been announced a new entrant to the DVB-H market in the United States. This entrant, Hiwire, a subsidiary of Aloha Partners, has announced that it will use DVB-H technology to launch a mobile television trial in autumn of 2006. Aloha Partners owns a large allotment of 700 MHz spectrum across the United States, consisting of 12 MHz corresponding to channels 54 and 59, a total frequency band of 710-746 MHz. Hiwire has partnered with SES Americom to provide a distribution network for the planned nationwide service. U.S. channel 54 is 710-716 MHz and channel 59 is 740-746 MHz.

Along with the problems noted above, the use of DVB-H in the frequency band of 710-746 MHz causes additional problems, as the GSM800 transmission frequency band in the United States is 824-849 MHz. This leaves little separation between the GSM800 transmission frequency band and the DVB-H reception band of 710-746 MHz.

In order to improve operability between a transmitter transmitting in a, e.g., cellular transmission frequency band such as the GSM800 frequency band and the DVB-H reception frequency band of 710-746 MHz, it is proposed to perform filtering of GSM800 frequency band. The filtering in an exemplary embodiment is performed adaptively by using, e.g., transmission on/off information, DVB-H channel, and DVB-H on/off information. The DVB-H channel corresponds to a reception frequency band the DVB-H receiver is using to receive a TV program. DVB-H reception frequency information is used to tune a response of a tunable filter toward or to optimal.

The cellular transmission is filtered with a tunable filter, which means that characteristics of the filter can be changed so that, e.g., a corresponding frequency response of the tunable filter can be changed. In an exemplary embodiment, this means that characteristics of the tunable filter are changed so that cellular band insertion loss is minimized when cellular reception is active. For instance, changing characteristics of the tunable filter can be performed so that when DVB-H is operating at low frequencies (e.g., lower numbered channels in the 710-746 MHz DVB-H UHF frequency band) then cellular band insertion loss is smaller and when DVB-H is receiving at high frequencies (e.g., higher numbered channels in the 710-746 MHz DVB-H UHF frequency band) then cellular band insertion loss is higher. This can be performed so that filter is tuned to filter cellular frequencies outside of the typical operational frequencies, as described in more detail below.

An improvement as compared to the embodiments discussed previously is the insertion loss of the cellular transmitter is constant even if the DVB-H reception is far away from the cellular transmission frequencies. With this new invention as described in FIGS. 14-24, if the DVB-H networks use low UHF frequencies (e.g., near 710 MHz for instance), then cellular transmission power can be better maintained to fulfill the cellular operator radiated power requirements.

When DVB-H reception is not active (e.g., DVB-H reception is idle) then the tunable filter is generally not used. Since DVB-H is a time sliced system, DVB-H reception is not active all the time. DVB-H is transmitted as time-domain packets, which are around 100 ms duration and the idle time between time slices may be around one second. This time slicing is done to improve mobile TV reception time with battery operated mobile stations. Since in an exemplary embodiment the tunable filter is not active, insertion loss caused by the tunable filter in the cellular frequency band is minimized, and this improves receiver radiated sensitivity by the insertion loss of the tunable filter. This is beneficial, as there are strict requirements from the cellular operators for the radiated receiver sensitivity.

Figure 14:
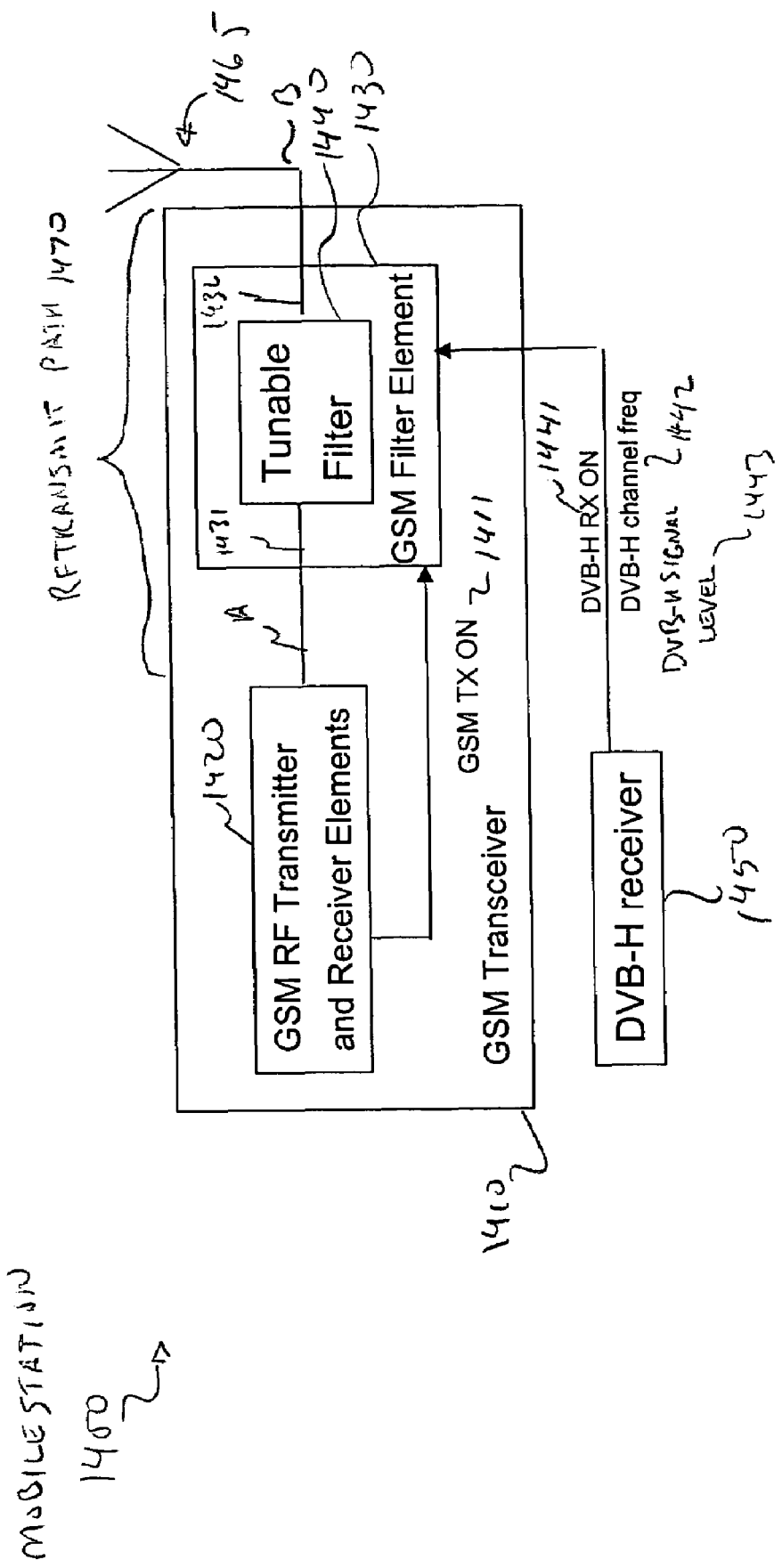
FIGS. 14-17 are block diagrams of different exemplary topologies for a mobile station to provide a tunable filter for improving interoperability between GSM transceivers and DVB-H receivers.

FIGS. 14-17 are block diagrams of different exemplary topologies for a mobile station to provide a tunable filter for improving interoperability between GSM transceivers and DVB-H receivers. In FIG. 14, a mobile station 1400 is shown comprising a GSM transceiver 1410, a DVB-H receiver 1450, and an antenna 1465, which could include multiple antennas. The GSM transceiver 1410 includes GSM RF transmitter and receiver elements 1420 and GSM filter element 1430. GSM filter element 1430 includes a tunable filter 1440 and has two connections 1431, 1432 used to couple the GSM filter element 1430 to the RF transmit path 1470. The tunable filter 1440 is coupled to (e.g., part of) RF transmit path 1470. In the example of FIG. 14, the DVB-H receiver 1450 produces signals DVB-H RX On signal 1441, which is active when the DVB-H receiver 1450 is able to receive a channel in a reception frequency band (e.g., waiting to receive, preparing to receive, or receiving DVB-H data), DVB-H channel frequency signal 1442, which corresponds to a channel and therefore a frequency band for DVB-H reception, and DVB-H signal level signal 1443, which is an indication of the signal level (e.g., power level) of the DVB-H signal (e.g., DVB-H RF signal 206 shown in FIG. 2) The GSM RF transmitter and receiver elements 1420 include in this example the RF ASIC 110, the BB ASIC 120, and the FEM 150 as shown in, e.g., FIGS. 1 and 2.

The GSM RF transmitter and receiver elements 1420 produces the GSM TX On signal 1411, which is active when a GSM transmission is about to occur or is occurring. The signals 1411, 1441, 1442, and 1443 will typically be implemented in hardware. For instance, the signals 1411 and 1441 could each be implemented using a single trace on a printed wiring board. The signal 1442 could be implemented using one or more traces, depending on the number of channels and equivalent frequency bands to be distinguished. In the example of the 710-746 MHz frequency band, there are six channels, so three traces (yielding a total of eight different states) could be used. The signals 1411, 1441, 1442, and 1443 could also be communicated using software, such as through messages, setting bits in a register, etc. It is noted that in certain embodiments the DVB-H channel frequency signal 1442 is not used. For instance, the DVB-H reception band of 1670-1675 MHz only has one channel. Similarly, the DVB-H signal level signal 1443 might not be used in some embodiments, and in certain embodiments, the DVB-H channel frequency signal 1442 can be used in place of the DVB-H RX On signal 1441.

The GSM filter element 1430 uses one or more of the signals 1411, 1441, 1442, and 1443 to adjust characteristics of the tunable filter 1440 through techniques to be described below. Insertion losses for the tunable filter 1440 (e.g., and also a fixed value filter as described below) can be optimized for each of the DVB-H reception frequency bands and the GSM transmission frequency bands. In one example described below, the tunable filter 1440 is an adjustable notch filter adjusted to set frequency of the "notch" created through resonance near the frequency band of the DVB-H channel being used. This setting therefore filters noise caused by the GSM frequency band used for transmission in the GSM reception frequency band.

Figure 15:
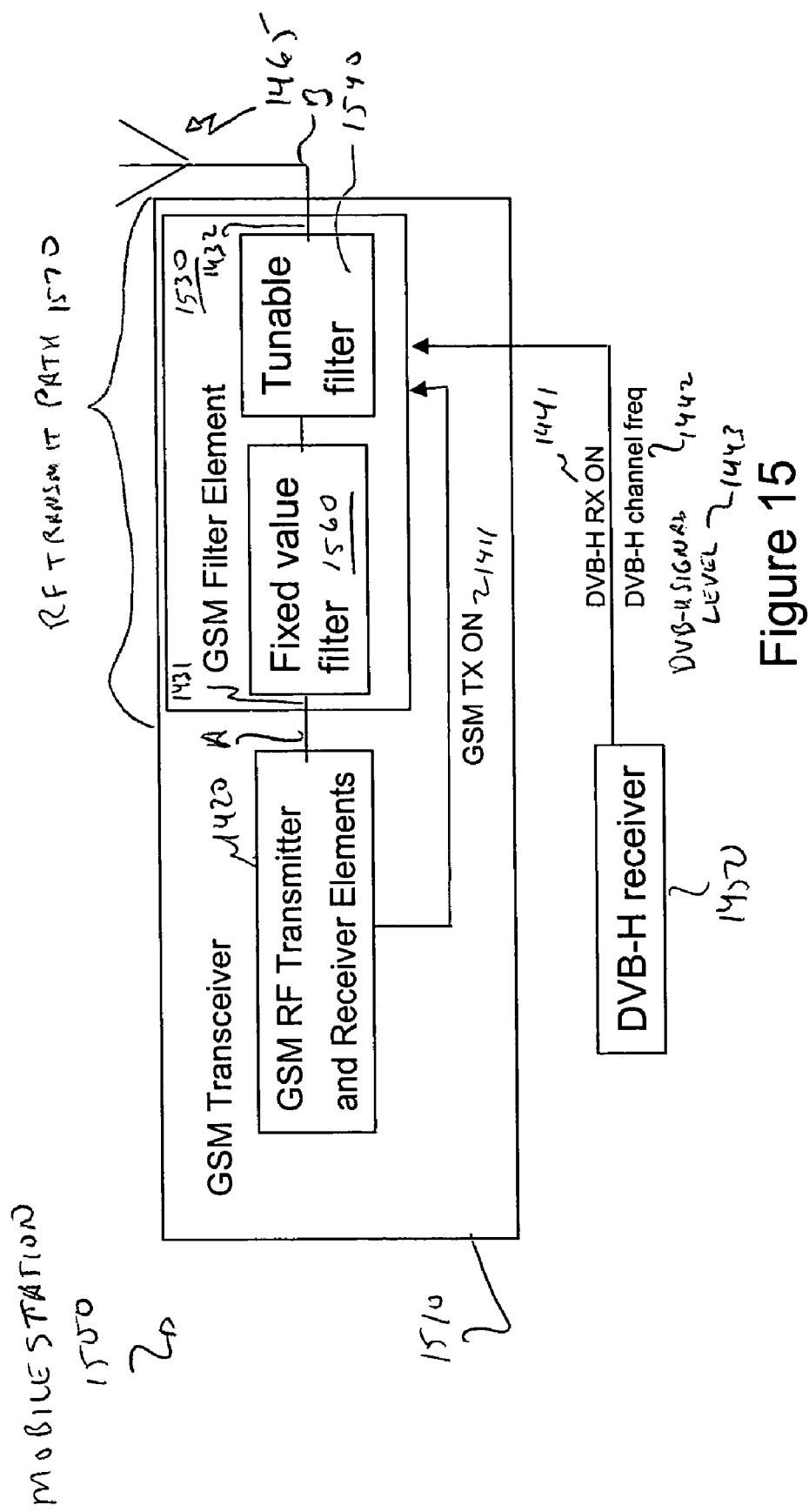
Figure 16:
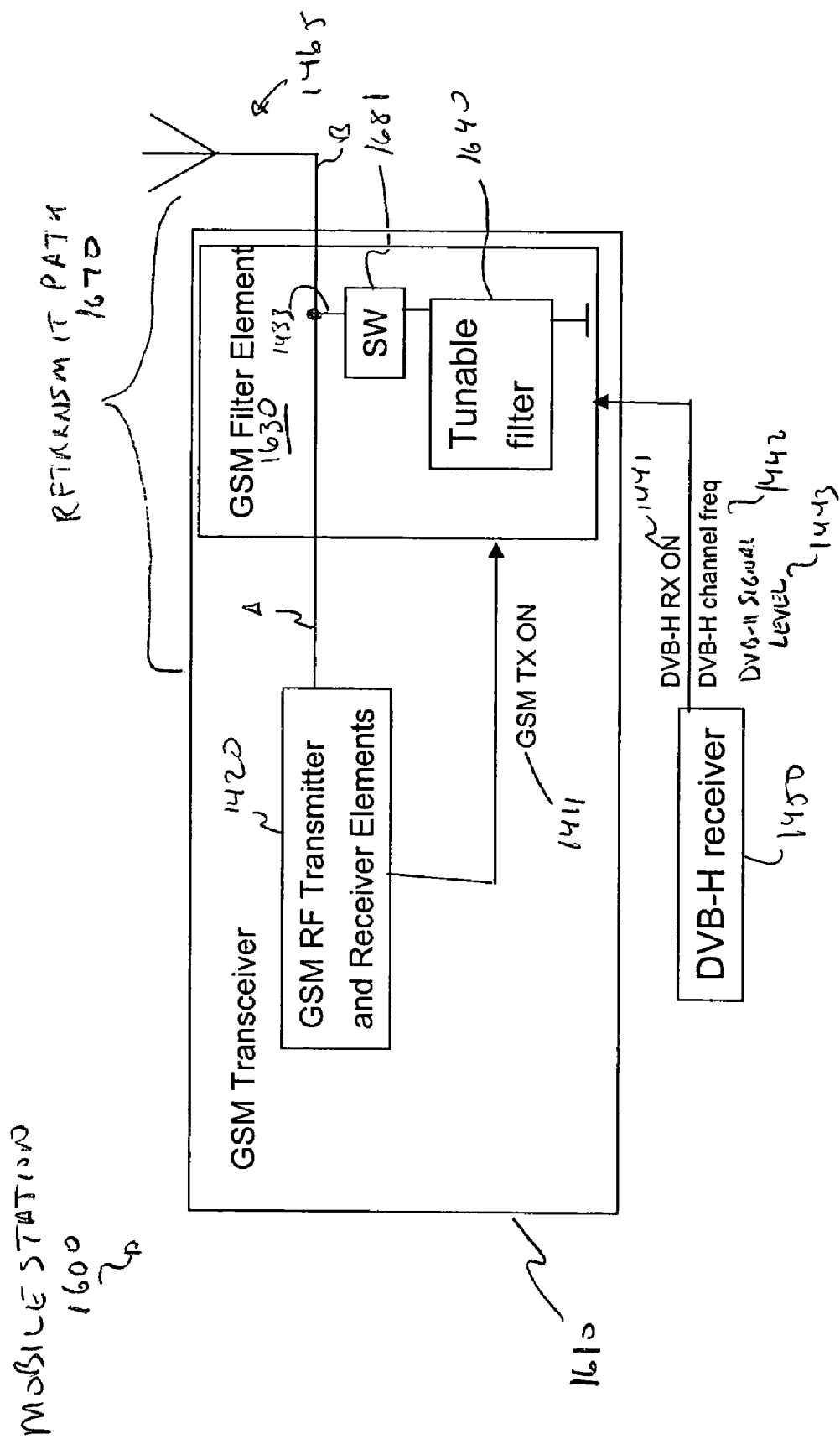
Figure 17:
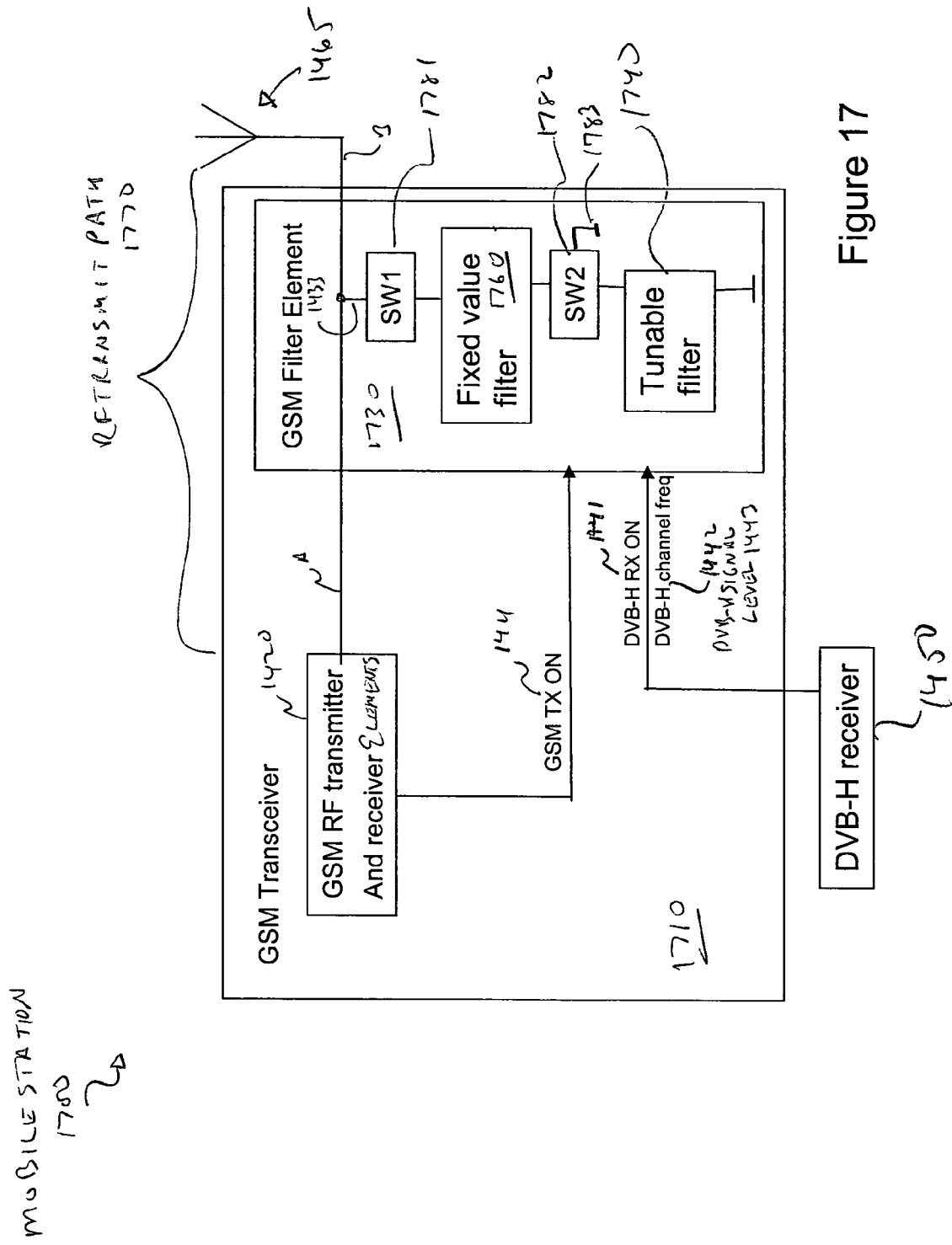

FIGS. 15-17 show additional exemplary embodiments of mobile stations. As the mobile stations in these figures are similar to the mobile stations in FIG. 14, only different elements of the figures will be described. FIG. 15 shows a mobile station 1500 including a GSM transceiver 1510 communicating over an RF transmit path 1570 to the antenna 1465, which could include multiple antennas. The GSM transceiver 1510 includes a GSM filter element 1530, which includes both a fixed value filter 1560 and a tunable filter 1540, both coupled to (e.g., part of) RF transmit path 1570. The fixed value filter 1560 is a filter which has constant frequency response (i.e., a frequency response not modifiable by changing characteristics of the filter). The fixed value filter 1560 may be a filter which attenuates the noise (see response 1801 of FIG. 18) caused by a GSM transmission in the low frequencies of the DBV-H band such as near the lower values of the 710-746 MHz frequency band. The tunable filter 1540 adds extra attenuation (see response 1802 of FIG. 18) and is used when DVB-H is receiving at the highest frequencies, such as near the highest frequencies of the 710-746 MHz band. Such high reception frequencies are close to the transmission frequency band used by a cellular transmission. As explained in reference to FIG. 22, when extra filtering is added, the insertion loss at the transmission frequency band is increased and thus this situation is avoided if possible.

Figure 19:
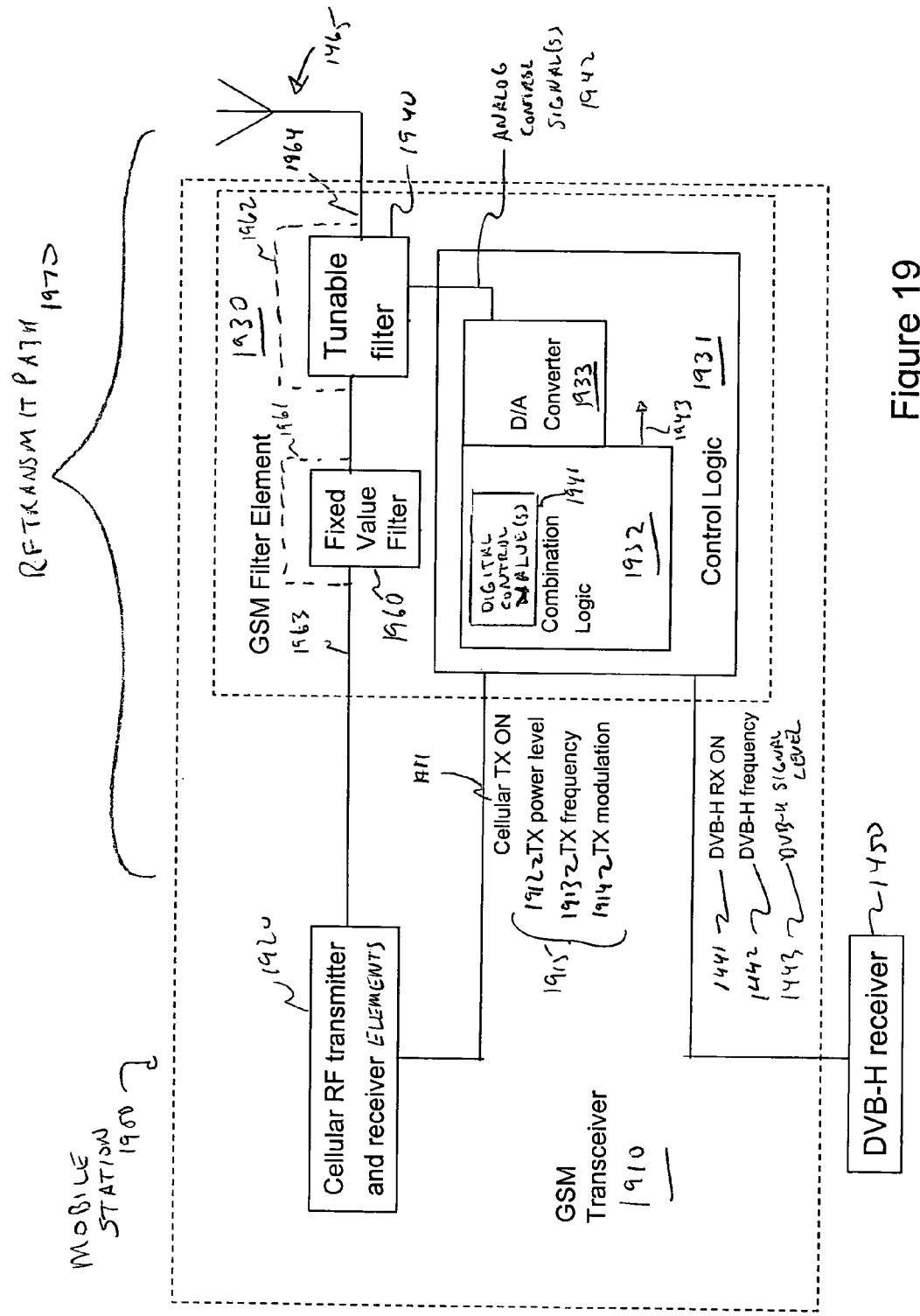
FIG. 19 is a block diagram of a mobile station suitable for improving interoperability between GSM transceivers and DVB-H receivers.

FIG. 16 shows a mobile station 1600 including a GSM transceiver 1610 communicating over an RF transmit path 1670 to the antenna 1465, which could include multiple antennas. The GSM transceiver 1610 includes a tunable filter 1640 coupled to RF transmit path 1670 by being connected to the RF transmit path 1670. The GSM filter element 1630 has a single connection 1433 used to couple the GSM filter element 1630 to the RF transmit path 1670. In certain embodiments, a switch 1681 may be used, where switch 1681 couples the tunable filter 1640 to or decouples the tunable filter 1640 from the RF transmit path 1670. Switch 1681 is controlled by control logic, e.g., in GSM filter element 1730 as shown in FIG. 19 for instance.

FIG. 17 shows a mobile station 1700 including a GSM transceiver 1710 communicating over an RF transmit path 1770 to the antenna 1465, which could include multiple antennas. The GSM transceiver 1710 includes a fixed value filter 1760 and tunable filter 1740, both coupled to RF transmit path 1770 by being connected to the RF transmit path 1770. The GSM filter element 1730 has a single connection 1433 used to couple the GSM filter element 1730 to the RF transmit path 1770. In certain embodiments, switches 1781, 1782 may be used, where switch 1781 couples the fixed value filter 1760 to or decouples the fixed value filter 1760 from the RF transmit path 1770. Switch 1782 couples tunable filter 1740 to the fixed value filter 1760 (thereby coupling the tunable filter 1740 to the RF transmit path 1770) or couples the fixed value filter 1760 to ground 1783. In another embodiment, switch 1782 is not used and switch 1781 is used.

Figure 18:
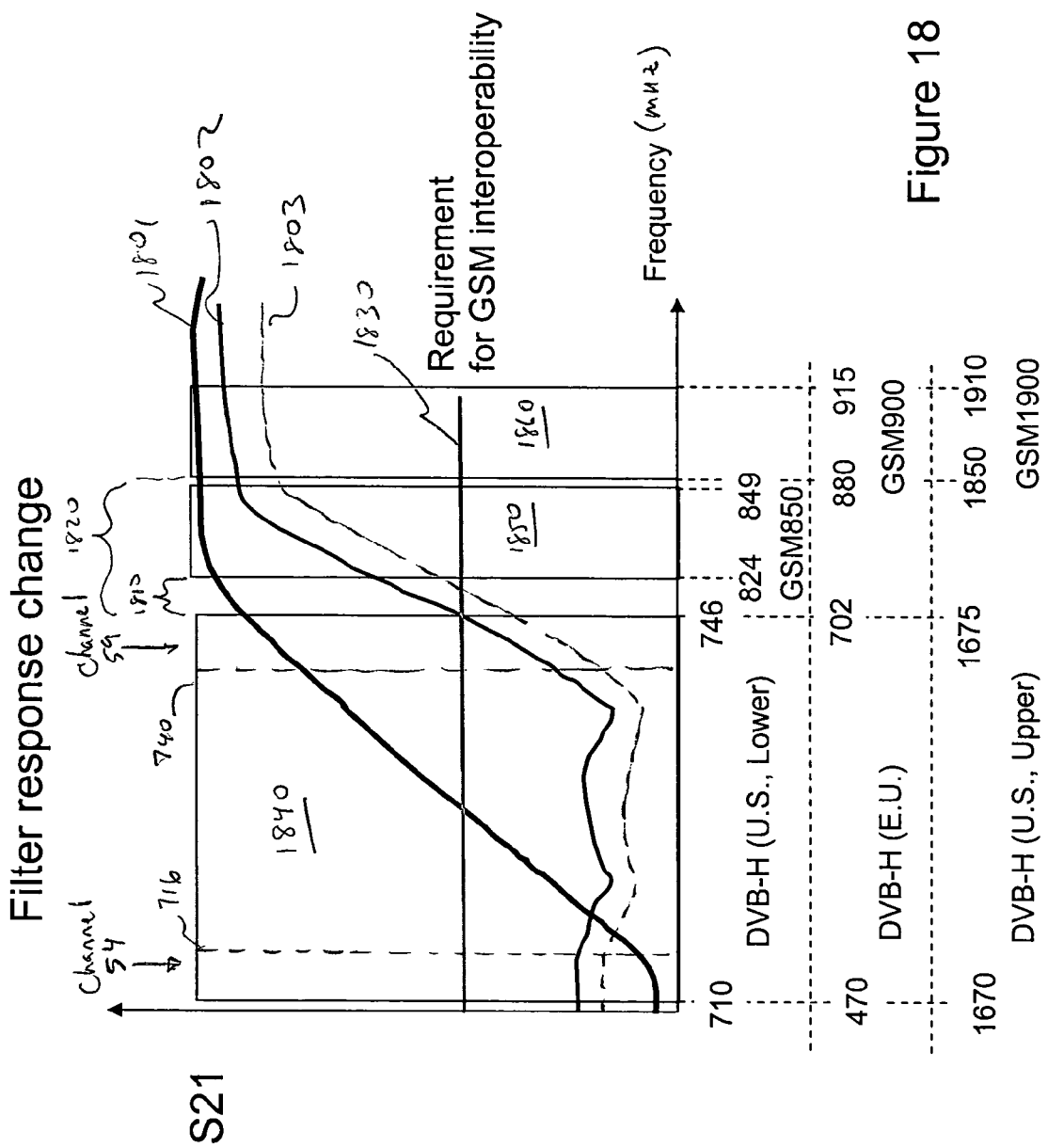
FIG. 18 is a graph of filter response change for an RF transmit path when a tunable filter is adjusted based on DVB-H channel and GSM transmission properties.

FIG. 18 is a graph of filter response change for an RF transmit path when a tunable filter is adjusted based on DVB-H channel and GSM transmission properties. FIG. 18 shows a graph of frequency response based on output point B and input point A in FIGS. 14-17. Note that this figure considers a frequency response where the GSM filter elements 1430, 1530, 1630, and 1730 are applied to a GSM transmission (i.e., a GSM transmission is the input at input point A).

FIG. 18 shows three responses 1801, 1802, and 1803. Response 1801 illustrates a situation where a tunable filter has first characteristics generated using first control value(s), and response 1802 illustrates a situation where the tunable filter has second characteristics generated using second control value(s). As another example, response 1801 illustrates a situation using a fixed filter having fixed characteristics in combination with a tunable filter that has first characteristics generated using first control value(s), and response 1802 illustrates a situation where the fixed filter is combined with the tunable filter having second characteristics generated using second control value(s). Characteristics of the tunable filter include, but are not limited to, a resonance frequency, attenuation of the filter at certain frequencies, and phase response of the filter at pass and rejection bands. Response 1803 is the response 1802 but at a different transmission power.

FIG. 18 shows three frequency bands 1840, 1850, and 1860. In one example, the frequency band 1840 is the DVB-H reception frequency band at 710-746 MHz and the frequency band 1850 is the GSM transmission frequency band at 824-849 MHz. In this example, there is a difference 1810 of 78 MHz between the DVB-H reception and GSM transmission frequency bands. If a mobile station is receiving on channel 54, corresponding to the frequency band of 710-716 MHz, the response 1801 is suitable, as the response 1801 in the frequency band 710-716 MHz is below the line 1830, which indicates the requirement for GSM operability with DVB-H. On the other hand, if a mobile station is receiving channel 59, corresponding to the frequency band of 740-746 MHz, the response 1801 is no longer suitable, as the response 1801 in the frequency band 740-746 MHz is well above the line 1830. Consequently, characteristics of the tunable filter are modified such that the response 1802 results, and the response 1802 is below the line 1830 in the frequency band of 740-746 MHz. Thus, by changing characteristics of the tunable filter based, e.g., on the DVB-H channel being used, the response can be changed to reduce interference caused by the GSM transmission on the DVB-H channel.

It is noted that the DVB-H channel is only one element that can be used when determining how to change characteristics of the tunable filter. Another element is transmission power of the GSM transmitter. As an example, the response 1803 is a response that might occur if the response 1802 is transmitted at a lower transmission power and the characteristics of the tunable filter are adjusted without consideration for the transmission power. It can be seen that the characteristics of the tunable filter might be changed to account for transmission power also. Other elements that can be considered when changing the characteristics of the tunable filter include modulation for the GSM transmission, as different modulation schemes may have different noise performance outside of the transmission frequency band. The adjacent channel power that is leaking outside of the transmission frequency band is dependent on transmission modulation method. Since the noise level outside the GSM transmission frequency band is dependent on the modulation used by the transmitter, the required antenna isolation and filtering requirement are then relative to the modulation. Another element is GSM transmission frequency (e.g., channel) within the GSM850 transmission band being used. For example, as described in more detail in reference to FIG. 24 below, a GSM transmission at 849 MHz (channel 251) can use different characteristics for the tunable filter than could a GSM transmission at 824 MHz (channel 128). GSM850 includes 124 channels spaced 200 kHz apart.

Yet another element that can be used when determining how to change characteristics of the tunable filter is the signal level (e.g., power level) of the DVB-H signal level signal 1443. This information can be routed to GSM filter elements along with DVB-H on/off information (e.g., from DVB-H RX On signal 1441) and DVB-H channel frequency information (e.g., from DVB-H channel frequency 1442). Since the DVB-H signal level is a varying during the reception then the actual noise level which is tolerated is also varying. When the DVB-H signal is strong then the actual noise level which is generated by other radio transmission can be higher and for this reason the applied filtering to a GSM transmission (for instance) can be lower than when the DVB-H signal is weak or near the sensitivity level of the DVB-H receiver.

FIG. 18 also shows other possible situations where tunable filters may be applied. In particular, the DVB-H frequency band in the E.U. of 470-702 MHz (as frequency band 1840) and the GSM900 transmission band in the E.U. of 880-915 MHz (as frequency band 1860). Note that the difference 1820 between the DVB-H frequency band and the GSM900 transmission frequency band in the E.U. is 178 MHz, which relaxes the requirements for the tunable filter relative to the DVB-H/GSM850 situation. The DVB-H reception frequency band in the U.S. of 1670-1675 MHz (as frequency band 1840) and the GSM1900 transmission band in the U.S. of 1850-1910 MHz (as frequency band 1860) is also suitable. The difference 1820 between these two latter frequency bands is 175 MHz, which relaxes the requirements for the tunable filter relative to the DVB-H/GSM850 situation.

FIG. 19 is a block diagram of a mobile station 1900 suitable for improving interoperability between GSM transceivers and DVB-H receivers. In FIG. 19, a mobile station 1900 is shown comprising a GSM transceiver 1910, a DVB-H receiver 1450, and an antenna 1465, which could include multiple antennas. The GSM transceiver 1910 includes GSM RF transmitter and receiver elements 1920 and GSM filter element 1930. GSM filter element 1930 includes a fixed value filter 1960 and a tunable filter 1940, and has two connections 1963, 1964 used to couple the GSM filter element 1930 to the RF transmit path 1970. The fixed value filter 1960 and tunable filter 1940 are coupled to (e.g., part of) RF transmit path 1970. In an exemplary embodiment, the GSM filter element 1930 includes a bypass path 1961, where the bypass path 1961 is used to decouple the fixed value filter from the RF transmit path 1970. In another exemplary embodiment, the GSM filter element 1930 includes a bypass path 1962, where the bypass path 1962 is used to decouple the fixed value filter from the RF transmit path 1970. Thus, none, one, or both bypass paths 1961, 1962 might be used. It is also noted that a bypass path could be used from connection 1963 to connection 1964 to bypass both fixed value filter 1960 and tunable filter 1940, thereby allowing both filters 1960, 1940 to be coupled to or decoupled from the RF transmit path 1970. The GSM RF transmitter and receiver elements 1920 include in this example, the RF ASIC 110, the BB ASIC 120, and the FEM 150 as shown in, e.g., FIGS. 1 and 2. It is noted that the GSM RF transmitter and receiver elements 1920 and 1420 would include control logic (e.g., control logic 285 shown in FIG. 2) for, e.g., generating the signals 1911-1914. Similarly, the DVB-H receiver 1450 would include control logic (e.g., control logic 208 shown in FIG. 2) for generating the signals 1441-1443.

The GSM RF transmitter and receiver elements 1920 produce the cellular TX On signal 1911, which is active when a GSM transmission is about to occur or is occurring. The GSM RF transmitter and receiver elements 1920 also produces the signals TX power level 1912, an indication of the transmission power level of the GSM transmission, TX frequency 1913, an indication of the frequency band/channel being used for the GSM transmission, and TX modulation 1914, an indication of the modulation scheme being used by the GSM transmission. The modulation schemes which GSM transmitter may include are GMSK (Gaussian Minimum Shift Keying) for GSM voice calls and GPRS (General Packet Radio Service) data communications and 8-PSK (8-Phase Shift Keying) for the EDGE (Enhanced Data rates for GSM Evolution) data packet communications. Since the 8-PSK includes amplitude modulation compared to GMSK, which is a constant envelope modulation scheme, the 8-PSK will produce higher noise due to amplitude modulation. For this reason, the 8-PSK will need higher attenuation than GMSK modulation at certain frequencies. The signals 1912, 1913, and 1914 are properties 1915 of the GSM transmission. The combination logic 1932 produces control signals 1943 in order to control whether or not the bypass paths 1961, 1962 are used. The signals 1911-1914 will typically be implemented in hardware, but may also be implemented in software, as described above.

Figure 22:
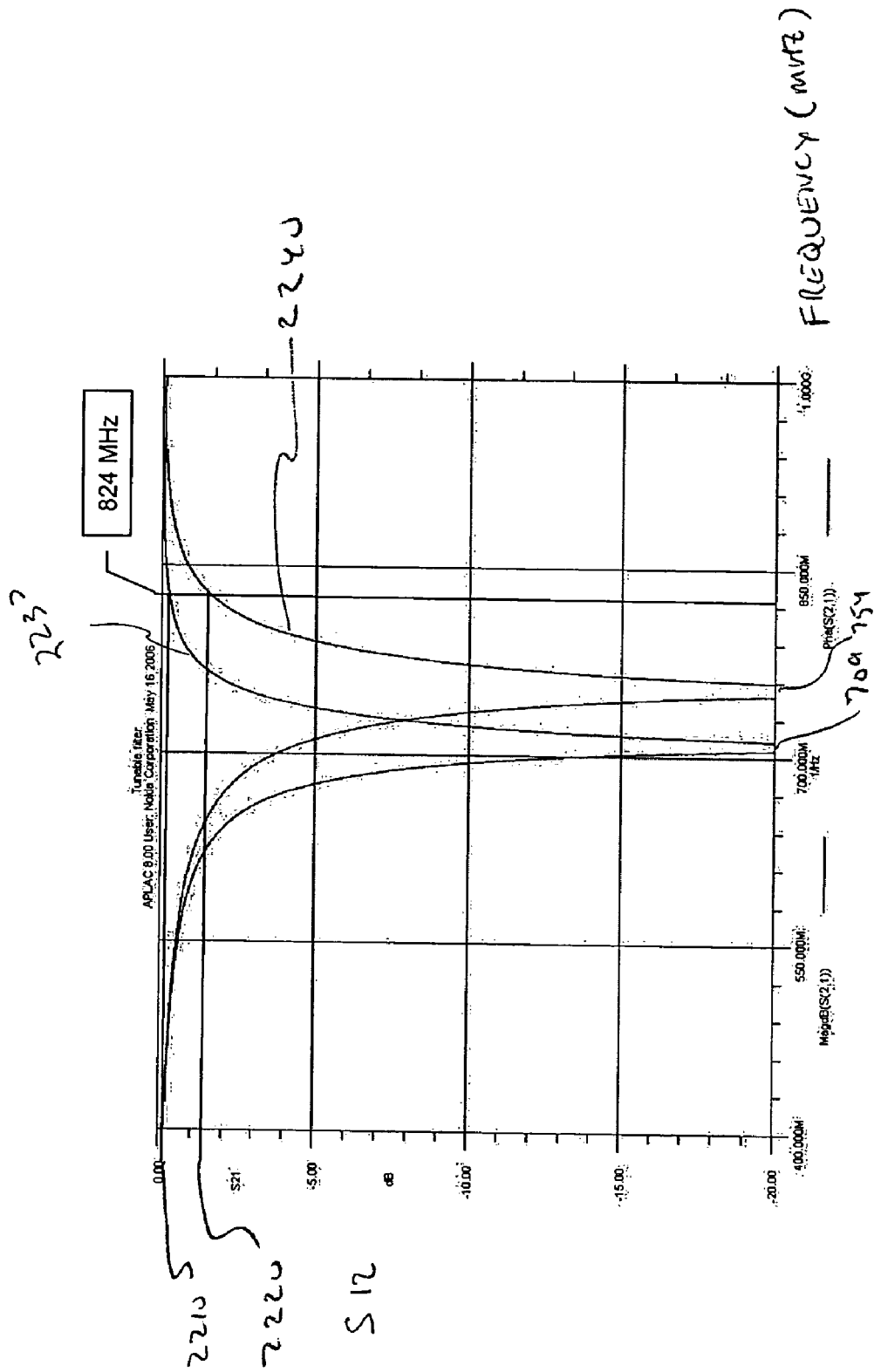
FIG. 22 is a graph illustrating filter responses for the filter of FIG. 21.

The GSM filter element 1930 further includes control logic 1931 including combination logic 1932 and digital-to-analog (D/A) converter 1933. The combination logic 1932 includes digital control value(s) 1941. The combination logic 1932 uses the information from signals 1911-1914, 1441, and 1442, and creates digital control value(s) 1941. The combination logic 1932 communicates the digital control value(s) 1941 to the D/A converter 1933, which then creates analog control value(s) 1942 therefrom, and the analog control values(s) 1942 are coupled to the tunable filter 1940 to change characteristics of the tunable filter 1940. One exemplary method used by combination logic 1932 is shown in FIG. 22.

It is noted that the GSM filter element 1930 (and GSM filter elements 1430, 1530, 1630, and 1730) can be implemented in a number of ways. For instance, the GSM filter elements could be implemented on an integrated circuit as part of FEM 150 for example. As another example, the filters 1940, 1960 (and filters shown in FIGS. 14-17, 20, and 21) could be implemented as discrete hardware elements on a printed wiring board, while control logic 1931 is implemented as part of an integrated circuit coupled to the filters 1940, 1960. As such, the control logic 1931 could be implemented in hardware, software, or a combination thereof.

Figure 20:
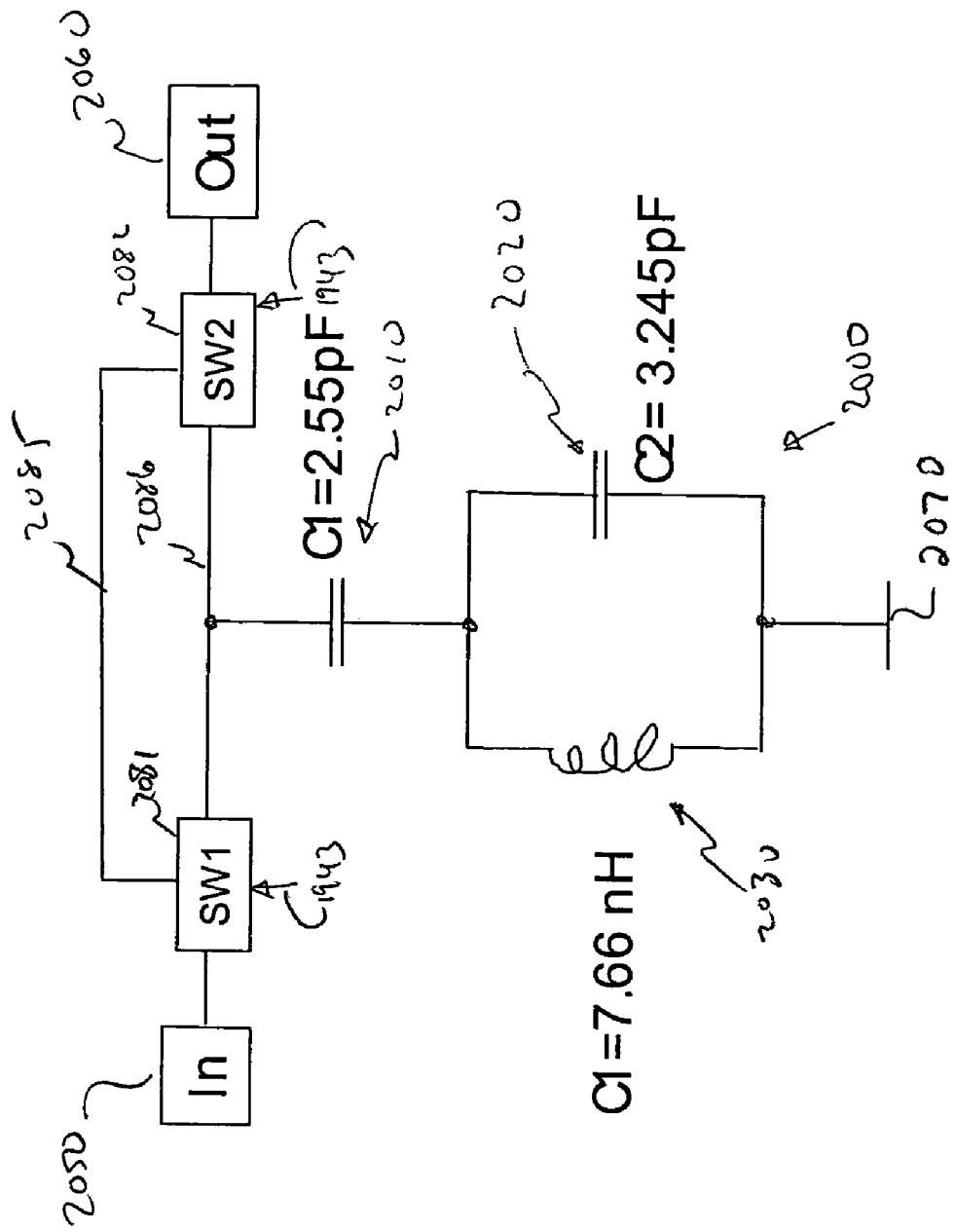
FIG. 20 is a diagram of an exemplary fixed value filter and associated circuitry.

Turning to FIG. 20, a diagram is shown of an exemplary fixed value filter 2000, such as could be used in fixed value filters 1560, 1760, and 1960 of FIGS. 15, 17, and 19, respectively, and associated circuitry. The fixed value filter 2000 comprises capacitors 2010, 2020 of 2.55 and 3.245 pico-farad (pf) respectively, an inductor 2030 of 7.66 nano-henries (nH). The associated circuitry includes an input 2050 (e.g., connection 1963 of FIG. 19), two switches 2081, 2082, an output 2060 (e.g., connection 1964 of FIG. 19), and a ground 2070. The switches 2081 and 2082 may or may not be used, depending on implementation. If used, the switches 2081 and 2082 are controlled by control signals 1943 and are used to select either bypass path 2085 to decouple the fixed value filter 2000 from an RF transmit path (e.g., RF transmit path 1970 shown in FIG. 19) or path 2086 to couple the fixed value filter 2000 to an RF transmit path (e.g., RF transmit path 1970 shown in FIG. 19). In this example, the fixed value filter 2000 is a notch filter having a resonance frequency at 709 MHz.

Figure 21:
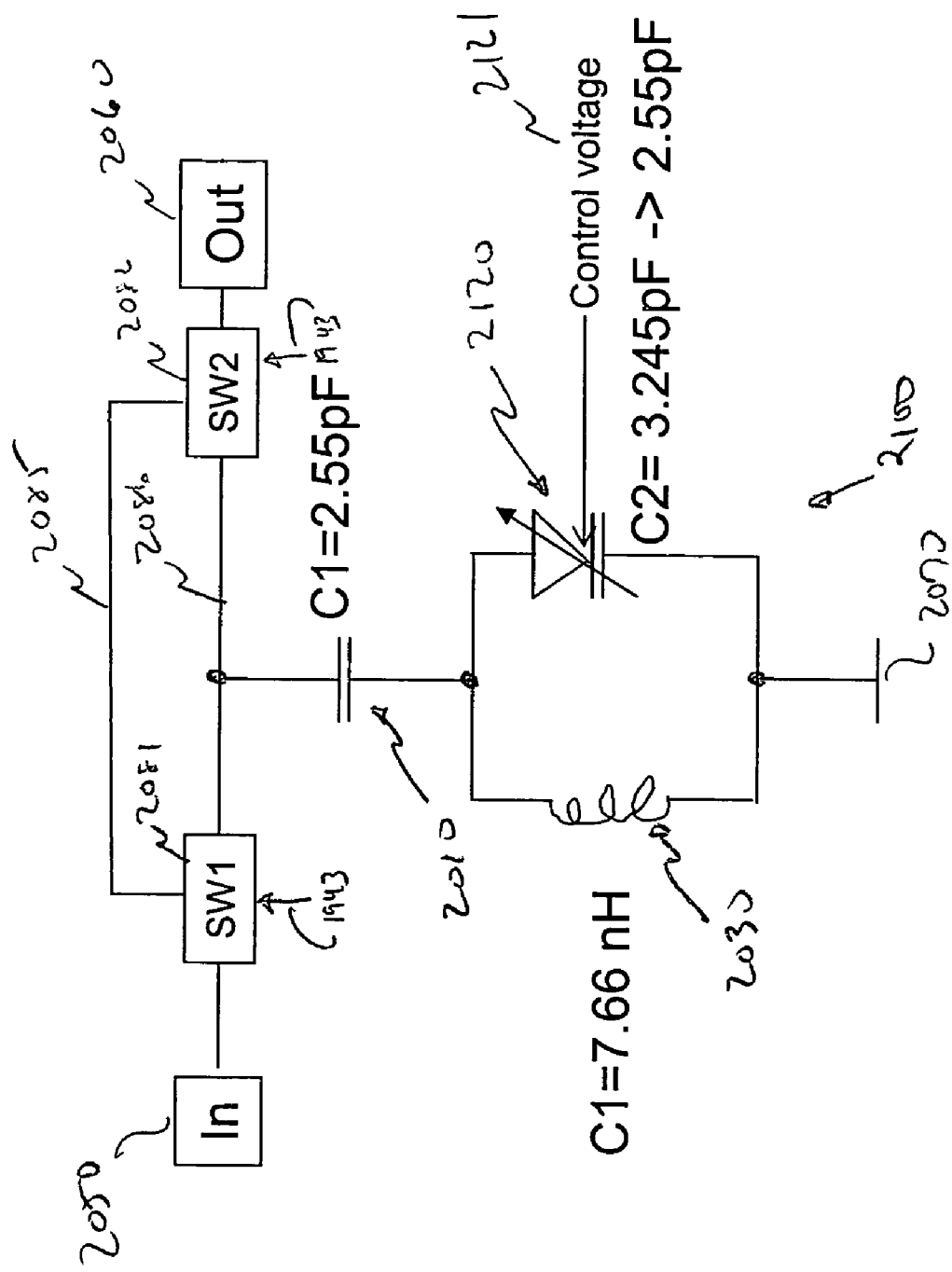
FIG. 21 is a diagram of an exemplary tunable filter and associated circuitry.

Turning now to FIG. 21, a diagram is shown of an exemplary tunable filter 2100 such as could be used in tunable filters 1540, 1740, and 1940 of FIGS. 15, 17, and 19, respectively, and associated circuitry. The tunable filter 2100 comprises capacitor 2010 of 2.55 pf, an inductor 2030 of 7.66 nH, and a capacitance diode 2120. The tunable filter 2100 needs at least one of a variable capacitance, variable inductance, or variable resistance component. These variable components may be used by selecting one value of several valued components which can be considered a component bank. For instance, there could be a resistance bank having resistors $R_1 \ldots R_n$, and one of these resistances would be selected using, e.g., a switch. Variable capacitances may be implemented, e.g., with MEMS (Micro Electrical Mechanical Switches) and capacitance diodes (e.g., PIN-diodes, which typically have a P+ region and N+ region separated by an intrinsic region). The variable resistances may be implemented with resistance banks if an RC-type filter is used. The variable inductance may be implemented with inductance banks. The associated circuitry includes an input 2050, two switches 2081, 2082, an output 2060, and a ground 2070. The switches 2081 and 2082 may or may not be used, depending on implementation. If used, the switches 2081 and 2082 are controlled by control signals 1943 and are used to selected either bypass path 2085 to decouple the tunable filter 2100 from an RF transmit path (e.g., RF transmit path 1970 shown in FIG. 19) or path 2086 to couple the tunable filter 2100 to an RF transmit path (e.g., RF transmit path 1970 shown in FIG. 19). The capacitance diode 2120 is a diode having variable capacitance based on control voltage 2121, which is an analog control signal 1942 of FIG. 19. The capacitance is adjustable from 3.245 pF to 2.55 pF depending on the value of the control voltage 2121. The tunable filter 2100 is a notch filter having a resonance frequency at 709 MHz when capacitance diode 2120 is adjusted using the control voltage 2121 to a capacitance value of 3.245 pF and a resonance frequency at 754 MHz when capacitance diode 2120 is adjusted using the control voltage 2121 to a capacitance value of 2.55 pF.

FIG. 22 is a graph illustrating filter responses for the filter of FIG. 21. In FIG. 22, the response 2240 corresponds to the capacitance diode 2120 adjusted to a capacitance value of 3.245 pF and the tunable filter 2100 therefore adjusted to a resonance frequency of 709 MHz. Note that response 2240 also corresponds to a response of the fixed value filter 2000. The response 2230 corresponds to the capacitance diode 2120 adjusted to a capacitance value of 2.55 pF and the tunable filter 2100 therefore adjusted to a resonance frequency of 754 MHz. When the tunable filter is adjusted to a resonance frequency of 709 MHz, insertion loss 2210 at 824 MHz (the lowest frequency in the GSM850 transmission band) is 0.22 dB (e.g., −0.22 dB). When the tunable filter is adjusted to a resonance frequency of 754 MHz, insertion loss 2220 at 824 MHz is 1.69 dB (e.g., −1.69 dB). What this means is that as resonance frequency is adjusted higher (by lowering capacitance of the capacitance diode 2120), smaller insertion loss results. Therefore, if the capacitance of the capacitance diode 2120 is decreased lower than 2.55 pF, the resonance frequency is lowered and insertion loss is also lowered.

Figure 23:
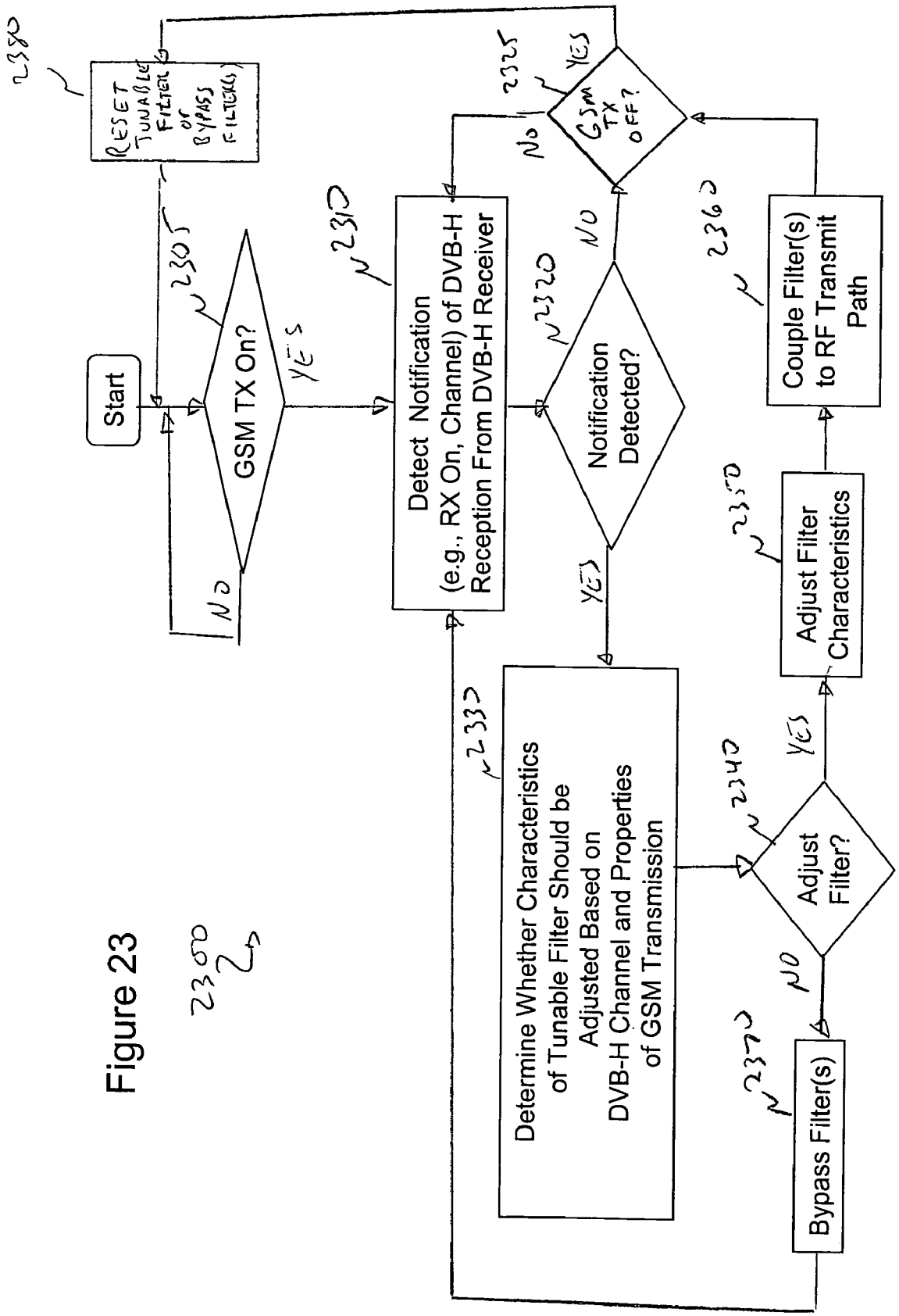
FIG. 23 is a flow chart of a method for improving interoperability between GSM transceivers and DVB-H receivers.

Referring now to FIG. 23, a flow chart is shown of a method 2300 for improving interoperability between GSM transceivers and DVB-H receivers. In this description, the embodiment of FIG. 19 is used, but it is noted that the embodiments of FIGS. 14-17 may also be used. Method 2300 is performed by the control logic 1931 of the GSM transceiver 1910 and more specifically by the combination logic 1932. Method 2300 starts in step 2305, where it is determined if a GSM transmission is occurring (e.g., or is about to occur), as determined for instance by the cellular TX On signal 1911. If the GSM transmission is not occurring (step 2305=NO), the method 2300 waits. If a GSM transmission is occurring (step 2305=YES), a detection of a notification of DVB-H reception from the DVB-H receiver 1450 is performed in step 2310. Typically, the DVB-H RX On signal 1441 is used to detect notification of DVB-H reception, although it is also noted that the signal DVB-H frequency signal 1442 (e.g., indicative of DVB-H reception channel) may also be used for this detection. As an example, the DVB-H RX On signal 1441 is not used and a particular state of DVB-H frequency signal 1442 is used to indicate no reception, while other states of the DVB-H frequency signal 1442 correspond to the DVB-H channel being used for DVB-H reception.

If notification is not detected (step 2320=NO), it is determined if the GSM transmission is over (step 2325). If so (step 2325=YES), method 2300 proceeds to step 2380, described in more detail below. It is noted that if no notification was ever detected in method 2300, then step 2380 might not perform a function, as characteristics of the tunable filter would not have been adjusted and, if bypassing is used, the fixed value and/or tunable filter would have been bypassed and such bypassing would not have been changed and therefore would not need to be reset. If notification is not detected (step 2320=YES), it is determined whether characteristics of the tunable filter (e.g., tunable filter 1940 of FIG. 19) should be adjusted based on the DVB-H channel (e.g., as indicated by the DVB-H frequency signal 1442) being used for reception and on properties 1915 of the GSM transmission. The properties 1915 of the GSM transmission include one or more of the transmission power (e.g., as indicated by the TX power level signal 1912), the transmission frequency (e.g., as indicated by the TX frequency signal 1913, which also corresponds to a channel in the GSM transmission frequency band), and the transmission modulation (e.g., as indicated by the TX modulation signal 1914). Note that use of the properties 1915 could be optional. Illustratively, if a tunable filter 1940 is used only at the output of a GSM850 transmitter, then an implementation could use only the cellular TX On signal 1911 and the DVB-H frequency 1442 in order to adjust characteristics of the tunable filter 1940.

If it is determined that the tunable filter 1940 needs to be adjusted (step 2340=YES), characteristics of the tunable filter 1940 are adjusted in step 2350. The adjustment is performed to reduce, when the tunable filter 1940 is coupled to the RF transmit path 1970, interference caused by transmission in the GSM transmission frequency band with reception in the DVB-H reception frequency band.

Figure 24:
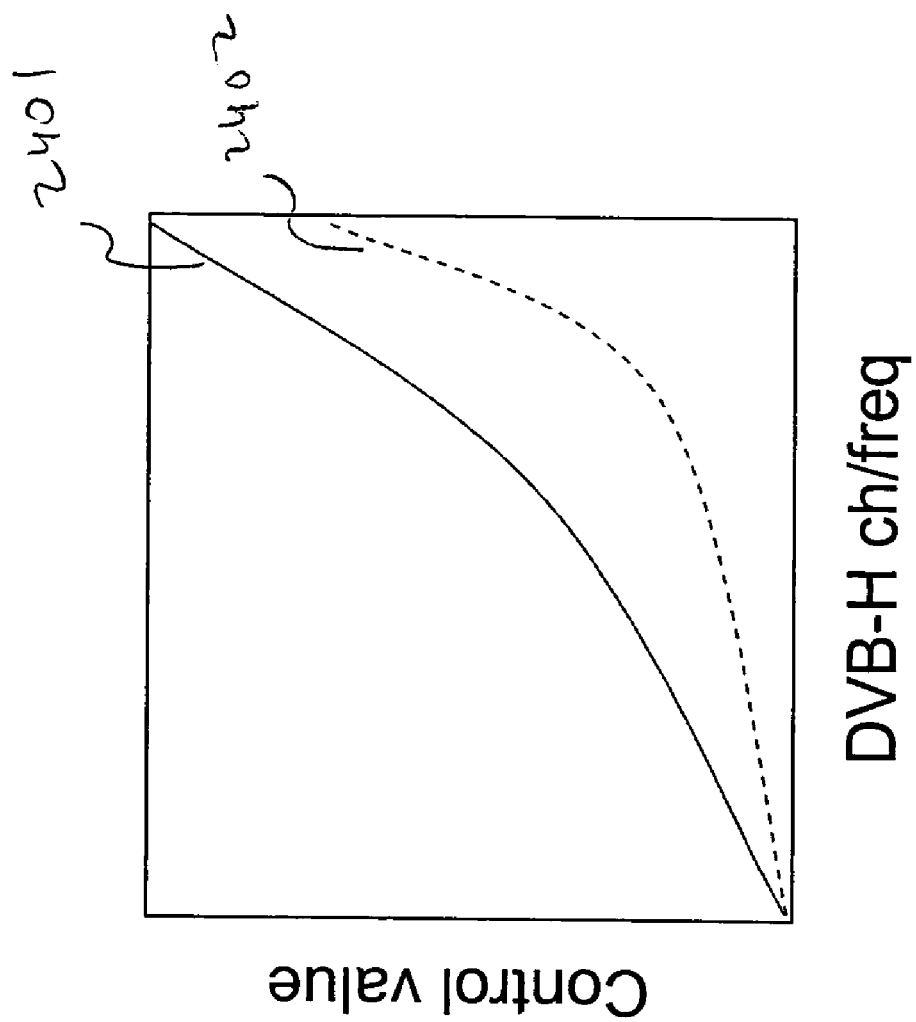
FIG. 24 is a graph of a control value and DVB-H channel for two different GSM transmission channels.

One example of the effects of adjusting an analog control value is given in FIG. 24. Turning briefly to FIG. 24, a control value (in this example, control voltage 2121 of FIG. 21) for the capacitance diode 2121 in FIG. 21 is shown for two frequencies in the GSM transmission frequency band. Curve 2401 corresponds to a GSM transmission at a frequency of 849 MHz (channel 251), and curve 2402 corresponds to a GSM transmission at a frequency of 824 MHz (channel 128). A higher control value corresponds to a lower capacitance value, which adjusts the notch frequency of the tunable filter (e.g., tunable filter 2100) to correspond to a higher DVB-H frequency/channel.

Returning to FIG. 23, in step 2360, implemented in certain embodiments, the tunable filter 1940 (and fixed value filter 1960, if used) is coupled to the RF transmit path 1970 in step 2360, e.g., by using switches 2081, 2082 as controlled by control signals 1943. If it is determined that the tunable filter 1940 does not need to be adjusted (step 2340=NO), the tunable filter 1940 (e.g., and perhaps the fixed value filter 1960) is bypassed in step 2370, if such bypassing is implemented.

It is noted that the path through 2320, 2325, and 2310 allows a different channel to be selected in the event that a new channel is selected while a GSM transmission occurs. This path also provides a loop to determine when the GSM transmission ends. When the GSM transmission ends (step 2352=Yes), as determined by the cellular TX On signal 1911, the tunable filter 1940 is reset in step 2380. If the tunable filter 1940 (e.g., and the fixed value filter 1960) can be bypassed, the filters could be bypassed in step 2380. Note that if the tunable filter 1940 is bypassed in step 2380, there typically is no reason to reset the tunable filter 1940 in step 2380.

It is noted that at least some of the steps of method 2300 could be performed simultaneously, depending on implementation. For example, combination logic 1932 is implemented in circuitry, then steps 2305 and 2310 and 2320 could be performed, e.g., using a NAND function such that when both cellular TX On signal 1911 and DVB-H RX On signal 1441 are asserted, a zero output will be produced, which will cause step 2330 to be performed. On the other hand, if the combination logic 1932 is performed in software, the cellular TX On signal 1911 and DVB-H On signal 1441 could be implemented as, e.g., signals that cause an interrupt to occur, where the software routine called because of the interrupt performs steps 2305 and 2310.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

Furthermore, some of the features of the preferred embodiments of this invention could be used to advantage without the corresponding use of other features. As such, the foregoing description should be considered as merely illustrative of the principles of the present invention, and not in limitation thereof.

What is claimed is:

1. A mobile station comprising:
a first antenna;
at least one second antenna;
a receiver coupled to the first antenna, the receiver comprising first control logic configured to generate a notification of the receiver being able to receive a reception frequency band; and
a transmitter coupled to the at least one second antenna and the receiver, the transmitter communicating radio frequency (RF) signals in a transmission frequency band over an RF transmit path to the at least one second antenna, the transmitter comprising:
a tunable filter coupleable to the RF transmit path; and
second control logic coupled to the tunable filter and configured to adjust at least one characteristic of the tunable filter based at least in part on the notification, the adjustment performed to reduce, when the tunable filter is coupled to the RF transmit path, interference caused by transmission in the transmission frequency band with reception in the reception frequency band.

2. The mobile station of claim 1, further comprising a display device coupled to the receiver and adapted to display at least information received from the receiver.

3. The mobile station of claim 1, wherein the at least one characteristic comprises at least one of a resonance frequency, attenuation of the tunable filter at certain frequencies, and phase response of the tunable filter at pass and rejection bands.

4. The mobile station of claim 1, wherein the notification further comprises information corresponding to a channel in the reception frequency band and wherein the second control logic is further configured to adjust the at least one characteristic of the tunable filter based at least in part on the information, the adjustment performed to reduce, when the tunable filter is coupled to the RF transmit, path interference caused by transmission in the transmission frequency band with reception in the channel of the reception frequency band.

5. The mobile station of claim 4, wherein the adjustment is performed to reduce, when the tunable filter is coupled to the RF transmit, path interference caused by transmission in the transmission frequency band to be less than a predetermined interoperability requirement in the channel of the reception frequency band.

6. The mobile station of claim 4, wherein the reception frequency band comprises a channel in a 710-746 megahertz (MHz) frequency band, and wherein the transmission frequency band comprises a portion of a 824-849 MHz frequency band.

7. The mobile station of claim 4, wherein the second control logic is further configured to adjust the at least one characteristic of the tunable filter based at least in part on at least one of transmission power level, transmission frequency, or transmission modulation for the transmission frequency band.

8. The mobile station of claim 7, wherein the second control logic further comprises combination logic coupled to a digital-to-analog (D/A) converter, the combination logic configured to determine at least one digital control value and to couple the at least one digital control value to the D/A converter, the D/A converter configured to produce at least one analog control value based at least in part on the at least one digital control value, the at least one analog control value adjusting the at least one characteristic of the tunable filter.

9. The mobile station of claim 1, wherein the notification further comprises information corresponding to a signal level of the reception frequency band and wherein the second control logic is further configured to adjust the at least one characteristic of the tunable filter based at least in part on the information, the adjustment performed to reduce, when the tunable filter is coupled to the RF transmit, path interference caused by transmission in the transmission frequency band with reception at the signal level of the reception frequency band.

10. The mobile station of claim 1, wherein the reception frequency band comprises a portion of a digital video band (DVB), and wherein the transmission frequency band comprises a portion of a cellular frequency band.

11. The mobile station of claim 10, wherein the reception frequency band comprises a portion of a 710-746 megahertz (MHz) frequency band, and wherein the transmission frequency band comprises a portion of a 824-849 MHz frequency band.

12. The mobile station of claim 10, wherein the reception frequency band comprises a portion of a 470-702 megahertz (MHz) frequency band, and wherein the transmission frequency band comprises a portion of a 880-915 MHz frequency band.

13. The mobile station of claim 10, wherein the reception frequency band comprises a portion of a 1670-1675 megahertz (MHz) frequency band, and wherein the transmission frequency band comprises a portion of a 1850-1910 MHz frequency band.

14. The mobile station of claim 1, wherein the tunable filter comprises an input and an output, and wherein each of the input and output is coupleable to the RF transmit path.

15. The mobile station of claim 1, wherein the tunable filter comprises an input and an output, and wherein the input is coupleable to the RF transmit path and the output is coupleable to ground.

16. The mobile station of claim 1, further comprising a fixed value filter coupled to the tunable filter and coupleable to the RF transmit path.

17. The mobile station of claim 16, further comprising at least one switch coupled to the second control logic, the at least one switch configured to couple under direction of the second control logic at least one of the tunable filter or the fixed value filter to the RF transmit path.

18. The mobile station of claim 16, wherein the fixed value filter comprises an inductor in parallel with a first capacitor, and comprises a second capacitor in series with the parallel inductor and first capacitor.

19. The mobile station of claim 1, wherein the tunable filter comprises at least one of a variable capacitance component, a variable inductance component, and a variable resistance component.

20. The mobile station of claim 1, wherein the tunable filter comprises an inductor in parallel with a variable capacitance component, and a capacitance in series with the parallel inductor and variable capacitor component.

21. The mobile station of claim 1, further comprising at least one switch coupled to the second control logic, the at least one switch configured to couple the tunable filter to the RF transmit path under direction of the second control logic.

22. In a mobile station comprising a first antenna and at least one second antenna, a method to operate a transmitter coupled to the at least one second antenna in combination with a receiver coupled to the first antenna, comprising:
generating a notification of the receiver being able to receive a reception frequency band from the first antenna;

based at least on the notification, adjusting characteristics of a tunable filter coupleable to a radio frequency (RF) transmit path of the transmitter, the adjustment performed to reduce, when the tunable filter is coupled to the RF transmit path, interference caused by transmission in a transmission frequency band with reception in the reception frequency band; and transmitting information in the transmission frequency band through the RF transmit path, with the tunable filter coupled thereto, to the at least one second antenna.

23. The method of claim 22, wherein the reception frequency band comprises a portion of a digital video band (DVB), and wherein the transmission frequency band comprises a portion of a cellular frequency band.

24. A computer program product comprising a machine-readable medium bearing a program of machine-readable instructions by an apparatus to perform operations for operating a transmitter coupled to at least one second antenna in combination with a receiver coupled to a first antenna, the operations comprising: generating a notification of the receiver being able to receive a reception frequency band from the first antenna, based at least on the notification, adjusting at least one characteristic of a tunable filter coupleable to a radio frequency (RF) transmit path of the transmitter, the adjustment performed to reduce, when the tunable filter is coupled to the RF transmit path, interference caused by transmission in a transmission frequency band with reception in the reception frequency band; and causing information to be transmitted in the transmission frequency band through the RF transmit path, with the tunable filter coupled thereto, to the at least one second antenna.

25. The computer program product of claim 24, wherein the reception frequency band comprises a portion of a digital video band (DVB), and wherein the transmission frequency band comprises a portion of a cellular frequency band.

26. An apparatus comprising:
an input for receiving a notification of a receiver being able to receive a reception frequency band;
a tunable filter;
at least one connection for coupling the tunable filter to a radio frequency (RF) transmit path of a transmitter;
control logic coupled to the tunable filter and to the input, the control logic responsive to at least the notification to adjust at least one characteristic of the tunable filter, the adjustment performed to reduce, when the tunable filter is coupled to the RF transmit path, interference caused by transmission by the transmitter in a transmission frequency band with reception in the reception frequency band.

27. The apparatus of claim 26, implemented as part of a mobile station.

28. The apparatus of claim 26, implemented as part of at least one integrated circuit.

29. The apparatus of claim 26, wherein the reception frequency band comprises a portion of a digital video band (DVB), and wherein the transmission frequency band comprises a portion of a cellular frequency band.

30. The apparatus of claim 26, further comprising another input for receiving information corresponding to a channel in the reception frequency band, wherein the control logic is further configured to adjust the at least one characteristic of the tunable filter based at least in part on the information, the adjustment performed to reduce, when the tunable filter is coupled to the RF transmit path, interference caused by transmission in the transmission frequency band with reception in the channel of the reception frequency band.

31. The apparatus of claim 26, further comprising another input for receiving information corresponding to a signal level of the reception frequency band and wherein the control logic is further configured to adjust the at least one characteristic of the tunable filter based at least in part on the information, the adjustment performed to reduce, when the tunable filter is coupled to the RF transmit, path interference caused by transmission in the transmission frequency band with reception at the signal level of the reception frequency band.

32. The apparatus of claim 26, further comprising at least one other input for receiving at least one property of a transmission in the transmission frequency band, the at least one property comprising at least one of transmission power level, transmission frequency, or transmission modulation for the transmission frequency band, and wherein the control logic is further configured to adjust the at least one characteristic of the tunable filter based at least in part on the at least one property.

33. The apparatus of claim 26, wherein the control logic further comprises combination logic coupled to a digital-to-analog (D/A) converter, the combination logic configured to determine at least one digital control value and to couple the at least one digital control value to the D/A converter, the D/A converter configured to produce at least one analog control value based at least in part on the at least one digital control value, the at least one analog control value suitable for adjusting the at least one characteristic of the tunable filter.

34. The apparatus of claim 26, further comprising a fixed value filter coupled to the tunable filter and coupleable to the at least one connection for coupling to the RF transmit path.

35. The apparatus of claim 26, wherein the tunable filter comprises at least one of a variable capacitance component, a variable inductance component, and a variable resistance component.

* * * * *